(12) United States Patent
Lee et al.

(10) Patent No.: US 9,417,789 B2
(45) Date of Patent: Aug. 16, 2016

(54) MOBILE TERMINAL AND CONTROLLING METHOD THEREOF

(75) Inventors: Ki Young Lee, Seoul (KR); Seon Yong Kim, Seoul (KR)

(73) Assignee: LG Electronics Inc., Seoul (KR)

(*) Notice: Subject to any disclaimer, the term of this patent is extended or adjusted under 35 U.S.C. 154(b) by 644 days.

(21) Appl. No.: 13/570,093

(22) Filed: Aug. 8, 2012

(65) Prior Publication Data

US 2013/0106742 A1    May 2, 2013

(30) Foreign Application Priority Data

Oct. 26, 2011 (KR) ........................ 10-2011-0109944

(51) Int. Cl.
| | | |
|---|---|---|
| G06F 3/041 | (2006.01) | |
| G06F 3/0488 | (2013.01) | |
| G06F 3/0484 | (2013.01) | |
| H04M 1/725 | (2006.01) | |

(52) U.S. Cl.
CPC .......... *G06F 3/04883* (2013.01); *G06F 3/0484* (2013.01); *H04M 1/72563* (2013.01); *H04M 2250/22* (2013.01)

(58) Field of Classification Search
CPC .................................................. G06F 3/04883
USPC ........................................................ 345/173
See application file for complete search history.

(56) References Cited

U.S. PATENT DOCUMENTS

| | | | |
|---|---|---|---|
| 8,411,045 B2* | 4/2013 | Futter ........................... | 345/173 |
| 2003/0025676 A1* | 2/2003 | Cappendijk ................... | 345/173 |
| 2006/0161871 A1* | 7/2006 | Hotelling et al. ............. | 715/863 |
| 2006/0242607 A1* | 10/2006 | Hudson ............... | G06F 3/04817 715/863 |
| 2006/0279554 A1* | 12/2006 | Shin et al. ..................... | 345/173 |
| 2008/0163119 A1* | 7/2008 | Kim et al. ..................... | 715/840 |
| 2009/0239588 A1* | 9/2009 | Nam ............................. | 455/566 |
| 2011/0310048 A1* | 12/2011 | B.R et al. ...................... | 345/173 |

* cited by examiner

*Primary Examiner* — Jason Olson
(74) *Attorney, Agent, or Firm* — Lee, Hong, Degerman, Kang & Waimey; Jonathan Kang; Richard Salfelder

(57) ABSTRACT

A mobile terminal and controlling method thereof are disclosed. The present invention includes a memory configured to set at least one touch gesture having a specific function assigned thereto, a memory configured to store at least one touch gesture to which a specific function is assigned, a touchscreen having a screen configured to receive the at least one touch gesture, and a controller configured to control the touchscreen to display a trajectory line of the received at least one touch gesture on the screen such that the trajectory line can be discriminated from other information displayed on the screen, to search the memory for the function assigned to the received at least one touch gesture, and to execute the function assigned to the received at least one touch gesture.

17 Claims, 21 Drawing Sheets

(a)

(b)

(a)

(b)

(a)

(b)

MOBILE TERMINAL AND CONTROLLING METHOD THEREOF

CROSS-REFERENCE TO RELATED APPLICATIONS

Pursuant to 35 U.S.C. §119(a), this application claims the benefit of earlier filing date and right of priority to Korean Application No. 10-2011-0109944, filed on Oct. 26, 2011, the contents of which are hereby incorporated by reference herein in their entirety.

BACKGROUND OF THE INVENTION

1. Field of the Invention

The present invention relates to a mobile terminal, and more particularly, to a mobile terminal and a method of controlling the mobile terminal.

2. Discussion of the Related Art

A mobile terminal is a device that can be configured to perform various functions, such as data and voice communications, capturing still images and video via a camera, recording audio, playing music files and outputting music via a speaker system, and displaying images and video on a display. Some terminals include additional functionality to support game playing, while other terminals are also configured as multimedia players. More recently, mobile terminals have been configured to receive broadcast and multicast signals to permit viewing of content, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

The ongoing development of display technology enables a terminal equipped with a touchscreen to be released.

If a user inputs a touch gesture to a screen of a touchscreen, a terminal displays a trajectory line indicating a pattern of the inputted touch gesture to enable the user to recognize the pattern of the touch gesture inputted by the user.

However, when the trajectory line is displayed on the screen of the touchscreen, if a color of the trajectory line is equal to that of a part of the screen at which the trajectory line is situated, it may be difficult for a user to recognize the trajectory line.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, which enables a user to recognize a trajectory line of a touch gesture displayed on a screen of a touchscreen with ease.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a memory configured to store at least one touch gesture to which a specific function is assigned, a touchscreen having a screen configured to receive the at least one touch gesture, and a controller configured to control the touchscreen to display a trajectory line of the received at least one touch gesture on the screen such that the trajectory line can be discriminated from other information displayed on the screen, to search the memory for the function assigned to the received at least one touch gesture, and to execute the function assigned to the received at least one touch gesture.

In another aspect of the present invention, a method of controlling a mobile terminal according to the present invention includes the steps of assigning a specific function to at least one touch gesture, receiving the at least one touch gesture via a touchscreen, displaying a trajectory line of the received at least one touch gesture on the touchscreen such that the trajectory line can be discriminated from other information displayed on the touchscreen, and executing the specific function assigned to the received at least one touch gesture after input of the at least one touch gesture is completed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The terms "module," "unit," and "part" are used herein with respect to various elements only to facilitate disclosure of the invention. Therefore, the terms "module," "unit," and "part" are used interchangeably herein.

The present invention can be applied to various types of terminals. For example, the terminals can include mobile terminals as well as stationary terminals, such as mobile phones, user equipments, smart phones, digital televisions (DTVs), computers, digital broadcast terminals, personal digital assistants, portable multimedia players (PMP) and navigators.

For ease of description, the present invention will be described with respect to a mobile terminal 100 shown in FIGS. 1 through 2B. However, it should be understood that the present invention can also be applied to other types of terminals.

Figure 1:
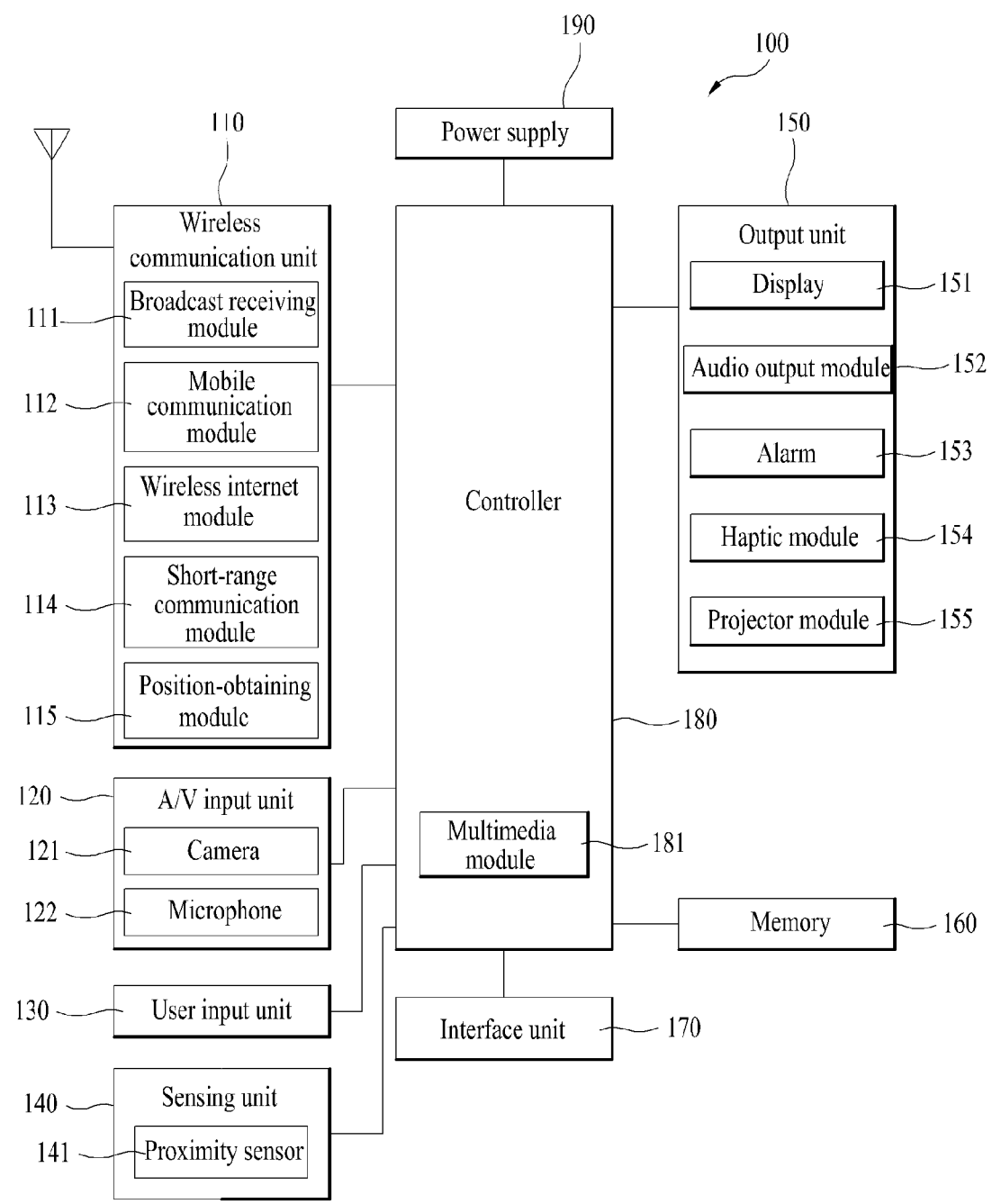
FIG. 1 illustrates a block diagram of a mobile terminal in accordance with one embodiment of the present invention.

FIG. 1 illustrates an exemplary block diagram of the mobile terminal 100 in accordance with one embodiment of the present invention. It should be understood that embodiments, configurations and arrangements other than that depicted in FIG. 1 can be used without departing from the spirit and scope of the invention. As shown in FIG. 1, the mobile terminal 100 includes a wireless communication unit 110, an audio/video (AV) input unit 120, a user input unit 130, a sensing unit 140, an output unit 150, a memory 160, an interface unit 170, a controller 180, and a power supply unit 190. It should be understood that the mobile terminal 100 may include additional or fewer components than those shown in FIG. 1.

The wireless communication unit 110 can include one or more components for allowing wireless communication between the mobile terminal 100 and a wireless communication system or network within which the mobile terminal 100 is located. For example, the wireless communication unit 110 can include a broadcast receiving module 111, a mobile communication module 112, a wireless Internet module 113, a short-range communication module 114, and a position-obtaining module 115.

The broadcast receiving module 111 receives a broadcast signal and/or broadcast related information from an external broadcast management server via a broadcast channel. In one embodiment, the mobile terminal 100 can be configured to include two or more broadcast receiving modules 111 to enable simultaneous reception of two or more broadcast channels or to facilitate switching of broadcast channels.

The broadcast channel can include a satellite channel and a terrestrial channel. The broadcast management server can be a server that generates and transmits a broadcast signal and/or broadcast related information, or a server that receives a previously-generated broadcasting signal and/or previously-generated broadcasting-related information and transmits the previously-generated broadcast signal and/or previously-generated broadcasting-related information to the mobile terminal 100.

For example, the broadcast signal can be implemented as a TV broadcast signal, a radio broadcast signal, a data broadcast signal, and various other types of signals. In one embodiment, the broadcast signal can include a combination of the broadcast signal and a TV broadcast signal or a combination of the broadcast signal and a radio broadcast signal.

The broadcast-related information can include broadcast channel information, broadcast program information, or broadcast service provider information. The broadcast-related information can be provided to the mobile terminal 100 through a mobile communication network. In such a case, the broadcast-related information can be received by the mobile communication module 112.

The broadcast-related information can be implemented in various forms. For example, the broadcast-related information can have the form of an electronic program guide (EPG) of the digital multimedia broadcasting (DMB) standard, or an electronic service guide (ESG) of the digital video broadcast-handheld (DVB-H) standard.

The broadcast receiving module 111 can be configured to receive broadcast signals transmitted from various types of broadcast systems, such as digital multimedia broadcasting-terrestrial (DMB-T), digital multimedia broadcasting-satellite (DMB-S), DVB-H, digital video broadcast—convergence of broadcast and mobile services (DVB-CBMS), Open Mobile Alliance broadcast (OMA-BCAST), the data broadcasting system known as media forward link only (MediaFLO®) and integrated services digital broadcast-terrestrial (ISDB-T) systems. The broadcast receiving module 111 can be configured to receive signals from broadcasting systems providing broadcasting signals other than the above-described digital broadcasting systems. The broadcast signal and/or broadcast-related information received via the broadcast receiving module 111 can be stored in a storage medium, such as the memory 160.

The mobile communication module 112 can transmit and/or receive wireless signals to and/or from at least one network entity, such as a base station, an external terminal, or a server. For example, such wireless signals can include audio, video, and data according to a transmission and reception of text/multimedia messages.

The wireless Internet module 113 can be a module that supports Internet access for the mobile terminal 100. For example, the wireless Internet module 113 can be included in the mobile terminal 100 or installed in an external device that is coupled to the mobile terminal 100. For example, the wireless Internet technology implemented by the wireless Internet module 113 can be a wireless local area network (WLAN), Wi-Fi, Wireless Broadband (WiBro™), World Interoperability for Microwave Access (WiMAX™), or High Speed Downlink Packet Access (HSDPA).

Moreover, as mentioned in the foregoing description, the wireless internet module 113 can receive or download the data relevant to the area, in which the mobile terminal 100 is located, from the external server.

The short-range communication module 114 can be a module for supporting relatively short-range communications. For example, the short-range communication module 114 can be configured to communicate using short range communication technology, such as, radio frequency identification (RFID), Infrared Data Association (IrDA), or Ultra-wideband (UWB), as well as networking technologies, such as Bluetooth™ or ZigBee™.

The position-obtaining module 115 identifies or otherwise obtains the location of the mobile terminal 100. In one embodiment, the position-obtaining module 115 can include a global positioning system (GPS) module.

The A/V input unit 120 can be used to input an audio signal or a video signal, and can include a camera 121 and a microphone 122. For example, the camera 121 can have a digital zoom feature and can process image frames of still images or video obtained by an image sensor of the camera 121 in a video call mode or a photographing mode. The processed image frames can be displayed on a display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 can receive an external audio signal while operating in a particular mode, such as a phone call mode, a recording mode or a voice recognition mode, and can process the received audio signal into electrical audio data. The audio data can then be converted into a form that can be transmitted to a mobile communication base station through the mobile communication module 112 in the call mode. The microphone 122 can apply various noise removal or noise canceling algorithms for removing or reducing noise generated when the external audio signal is received.

The user input unit 130 can generate input data in response to user manipulation of a corresponding input device or devices, such as a keypad, a dome switch, a touchpad, a jog wheel, or a jog switch. In one embodiment, the touchpad can be configured as a static pressure or capacitance type.

The sensing unit 140 can sense a change of position of the mobile terminal 100 or a component of the mobile terminal 100, relative positioning of components of the mobile terminal 100, such as a display and keypad, whether a user touches the mobile terminal 100, an orientation of the mobile terminal 100, acceleration or deceleration of the mobile terminal 100, and a current state of the mobile terminal 100, such as an open or close state. The sensing unit 140 can also include a proximity sensor 141.

The sensing unit 140 can generate a sensing signal for controlling the operation of the mobile terminal 100 according to a detected status of the mobile terminal. For example, when the mobile terminal 100 is implemented as a slide type phone, the sensing unit 140 can sense whether the mobile terminal 100 is opened or closed. Further, the sensing unit 140 can sense whether the power supply 190 supplies power and whether the interface unit 170 is connected to an external device.

The output unit 150 can generate visual, auditory and/or tactile outputs and can include the display unit 151, an audio output module 152, an alarm unit 153, a haptic module 154, and a projector module 155. The display unit 151 can be configured to display information processed by the mobile terminal 100.

For example, when the mobile terminal 100 is in a call mode, the display unit 151 can display a user interface (UI) or a graphic user interface (GUI) for placing, conducting, and terminating a call. For example, when the mobile terminal 100 is in the video call mode or the photographing mode, the display unit 151 can additionally or alternatively display images which are associated with such modes, the UI or the GUI.

The display unit 151 can be implemented using display technologies including, for example, a liquid crystal display (LCD), a thin film transistor-liquid crystal display (TFT-LCD), an organic light-emitting diode display (OLED), a flexible display and a three-dimensional display. The mobile terminal 100 can be configured to include more than one display unit 151 according to the configuration of the mobile terminal 100.

For example, the mobile terminal 100 can include a number of display units 151 that are arranged on a single face of the mobile terminal 100, and can be spaced apart from one another or integrated in one body. The number of display units 151 can also be arranged on different sides of the mobile terminal 100.

In one embodiment, the display used in the display unit 151 can be of a transparent type or a light transmittive type, such that the display unit 151 is implemented as a transparent display. For example, the transparent display can include a transparent OLED (TOLED) display. The rear structure of the display unit 151 can also be of a light transmittive type. Accordingly, a user may see an object located behind the body of the mobile terminal 100 through the transparent area of the body of the mobile terminal 100 that is occupied by the display unit 151.

When the display unit 151 and a sensor for sensing a user touch (hereinafter referred to as a "touch sensor") are configured as a layered structure to form a touch screen, the display unit 151 can be used as an input device in addition to an output device. For example, the touch sensor can be in the form of a touch film, a touch sheet, or a touch pad.

The touch sensor can convert a variation in pressure applied to a specific portion of the display unit 151 or a variation in capacitance generated at a specific portion of the display unit 151 into an electric input signal. The touch sensor can sense pressure resulting from a touch, as well as the position and area of the touch.

When the user applies a touch input to the touch sensor, a signal corresponding to the touch input can be transmitted to a touch controller (not shown). The touch controller can process the signal and transmit data corresponding to the processed signal to the controller 180. The controller 180 can then use the data to detect a touched portion of the display unit 151.

The proximity sensor 141 of the sensing unit 140 can be located in an internal region of the mobile terminal 100 and either enclosed by the touch screen or around the touch screen. The proximity sensor 141 can sense an object approaching a prescribed detecting surface or an object located near the proximity sensor 141 without any physical contact using an electromagnetic field or infrared rays. The longevity of the proximity sensor 141 can substantially exceed the longevity of a contact sensor and, therefore, can have wide applications in the mobile terminal 100.

The proximity sensor 141 can include a transmittive photoelectric sensor, a direct reflection photo-electric sensor, a mirror reflection photo-electric sensor, a radio frequency oscillation proximity sensor, an electrostatic capacity proximity sensor, a magnetic proximity sensor, and/or an infrared proximity sensor. In one embodiment, the touch screen can include an electrostatic capacity proximity sensor, such that a proximity of a pointer can be detected through a variation in an electric field according to the proximity of the pointer. Accordingly, the touch screen or touch sensor can be classified as the proximity sensor 141.

For purposes of clarity, an action of the pointer approaching the touch screen and being recognized without actually contacting the touch screen will be herein referred to as a "proximity touch," while an action of bringing the pointer into contact with the touch screen will be herein referred to as a "contact touch." A proximity touch position of the pointer on the touch screen can correspond to a position on the touch screen from which the pointer is situated perpendicularly with respect to the touch screen.

Via the proximity sensor 141, a proximity touch and a proximity touch pattern, such as a proximity touch distance, a proximity touch duration, a proximity touch position, or a proximity touch movement state can be detected. For example, information corresponding to the detected proximity touch action and proximity touch pattern can be displayed on the touch screen.

The audio output module 152 can output audio data received from the wireless communication unit 110, or stored in the memory 160, in a call receiving mode, a call placing mode, a recording mode, a voice recognition mode, or a broadcast receiving mode. The audio output module 152 can also provide audio signals related to particular functions performed by the mobile terminal 100, such as a call received or a message received. For example, the audio output module 152 can include a speaker, a buzzer, or other audio output device.

The alarm unit 153 can output a signal for indicating the occurrence of an event of the mobile terminal 100, such as a call received event, a message received event and a touch input received event, using a vibration as well as video or audio signals. The video or audio signals can also be output via the display unit 151 or the audio output module 152. Therefore, in various embodiments, the display unit 151 or the audio output module 152 can be considered as a part of the alarm unit 153.

The haptic module 154 can generate various tactile effects that can be physically sensed by the user. For example, a tactile effect generated by the haptic module 154 can include vibration. The intensity and/or pattern of the vibration generated by the haptic module 154 can be controlled. For example, different vibrations can be combined and provided or sequentially provided.

The haptic module 154 can generate a variety of tactile effects in addition to a vibration. Such tactile effects include an effect caused by an arrangement of vertically moving pins that are in contact with the skin of the user; an effect caused by a force of air passing through an injection hole or a suction of air through a suction hole; an effect caused by skimming over the user's skin; an effect caused by contact with an electrode; an effect caused by an electrostatic force; and an effect caused by the application of cold and warm temperatures using an endothermic or exothermic device.

For example, the haptic module 154 can enable a user to sense the tactile effects through a muscle sense of the user's finger or arm, as well as to transfer the tactile effect through direct contact. Optionally, the mobile terminal 100 can include at least two haptic modules 154 according to the configuration of the mobile terminal 100.

The projector module 155 is an element for performing an image projection function of the mobile terminal 100. In one embodiment, the projector module 155 can be configured to display an image identical to or partially different from an image displayed by the display unit 151 on an external screen or wall according to a control signal of the controller 180.

For example, the projector module 155 can include a light source (not shown), such as a laser, that generates adequate light for external projection of an image, means for producing the image (not shown) to be projected via the light generated from the light source, and a lens (not shown) for enlarging the projected image according to a predetermined focus distance. The projector module 155 can further include a device (not shown) for adjusting the direction in which the image is projected by mechanically moving the lens or the entire projector module 155.

The projector module 155 can be classified as a cathode ray tube (CRT) module, a liquid crystal display (LCD) module, or a digital light processing (DLP) module according to a type of display used. For example, the DLP module operates by enabling the light generated from the light source to reflect on a digital micro-mirror device (DMD) chip and can advantageously reduce the size of the projector module 155.

The projector module 155 can preferably be configured in a lengthwise direction along a side, front or back of the mobile terminal 100. It should be understood, however, that the projector module 155 can be configured on any portion of the mobile terminal 100.

The memory 160 can store various types of data to support the processing, control, and storage requirements of the mobile terminal 100. For example, such types of data can include program instructions for applications operated by the mobile terminal 100, contact data, phone book data, messages, audio, still images, and/or moving images.

A recent use history or a cumulative usage frequency of each type of data can be stored in the memory unit 160, such as usage frequency of each phonebook, message or multimedia. Moreover, data for various patterns of vibration and/or sound output when a touch input is performed on the touch screen can be stored in the memory unit 160.

The memory 160 can be implemented using any type or combination of suitable volatile and non-volatile memory or storage devices, such as a flash memory, a hard disk type memory, a multimedia card micro type memory, a card type memory, such as a Secure Digital (SD) card or Extreme Digital (xD) card, a random access memory (RAM), a static random access memory (SRAM), a read-only memory (ROM), an erasable programmable read-only memory (EPROM), a programmable ROM (PROM), an electrically erasable programmable read-only memory (EEPROM), a magnetic memory, a magnetic disk, an optical disk, or other type of memory or data storage device. In other embodiments, the memory 160 can be a storage device that can be accessed by the mobile terminal 100 via the Internet.

The interface unit 170 can couple the mobile terminal 100 to external devices. The interface unit 170 can receive data from the external devices or power, and transmit the data or power to internal components of the mobile terminal 100. In addition, the interface unit 170 can transmit data of the mobile terminal 100 to the external devices. The interface unit 170 can include, for example, a wired or wireless headset port, an external charger port, a wired or wireless data port, a memory card port, a port for connecting a device having an identity module, an audio input/output (I/O) port, a video I/O port, and/or an earphone port.

The identity module is the chip for storing various kinds of information for authenticating the authority to use the mobile terminal 100. For example, the identity module can be a user identify module (UIM), a subscriber identify module (SIM) or a universal subscriber identify module (USIM). A device including the identity module (hereinafter referred to as "identity device") can also be manufactured in the form of a smart card. Therefore, the identity device can be connected to the mobile terminal 100 via a corresponding port of the interface unit 170.

When the mobile terminal 100 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 can control the general operations of the mobile terminal 100. For example, the controller 180 can be configured to perform control and processing associated with voice calls, data communication, and/or video calls. The controller 180 can perform pattern recognition processing to recognize a character or image from a handwriting input or a picture-drawing input performed on the touch screen.

The power supply unit 190 can be an external power source, an internal power source, or a combination thereof. The power supply unit 190 can supply power to other components in the mobile terminal 100.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For example, the procedures or functions described herein can be implemented in software using separate software modules that allow performance of at least one function or operation. Software codes can be implemented by a software application or program written in any suitable programming language. The software codes can be stored in the memory 160 and executed by the controller 180.

Figure 2A:
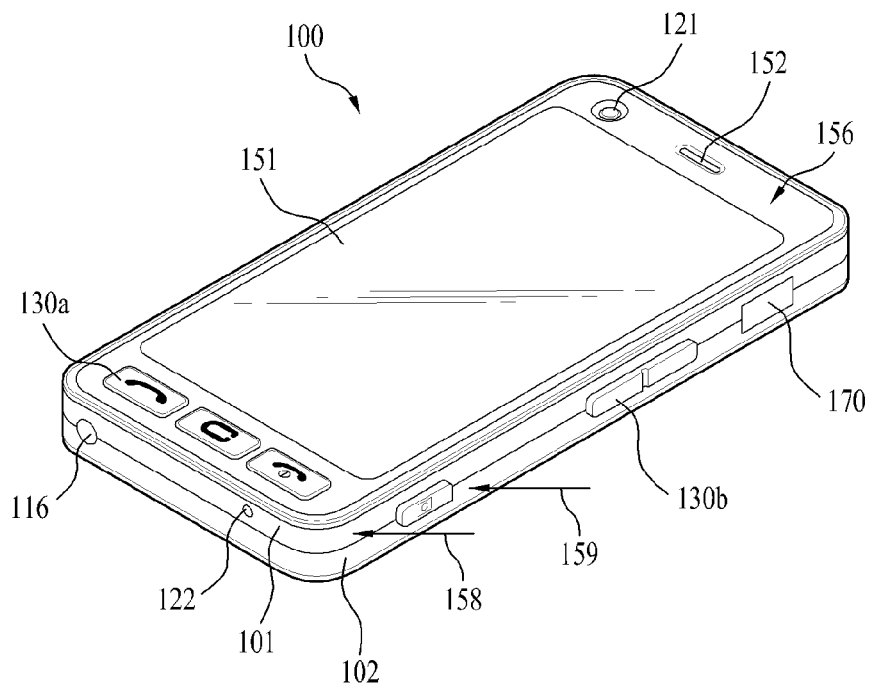
FIG. 2A is a front perspective view of the mobile terminal in accordance with one embodiment of the present invention.

FIG. 2A is a front perspective view of the mobile terminal 100 in accordance with one embodiment of the present invention. In FIG. 2A, the mobile terminal 100 is shown to have a bar type terminal body.

However, it should be understood that the mobile terminal 100 is not limited to a bar type terminal body and can have various other body types. Examples of such body types include a slide type body, folder type body, swing type body, a rotational type body, or combinations thereof. Although the disclosure herein is primarily with respect to a bar-type mobile terminal 100, it should be understood that the disclosure can be applied to other types of mobile terminals.

As shown in FIG. 2A, the case of the mobile terminal 100 (otherwise referred to as a "casing," "housing," or "cover") forming the exterior of the mobile terminal 100 can include a front case 101 and a rear case 102. Various electronic components are installed in the space between the front case 101 and the rear case 102. One or more intermediate cases can be additionally disposed between the front case 101 and the rear case 102. For example, the front case 101 and the rear case 102 can be made by injection-molding of a synthetic resin or can be made using a metal, such as stainless steel (STS) or titanium (Ti).

The display unit 151, the audio output module 152, the camera 121, user input modules 130a and 130b, the microphone 122, or the interface unit 170 can be situated on the mobile terminal 100, and specifically, on the front case 101.

As shown in FIG. 2A, for example, the display unit 151 can be configured to occupy a substantial portion of the front face 156 of the front case 101. As also shown in FIG. 2A, the audio output unit 152 and the camera 121 can be arranged in proximity to one end of the display unit 151, and the user input module 130a and the microphone 122 can be located in proximity to another end of the display unit 151. As further shown in FIG. 2A, the user input module 130b and the interface unit 170 are arranged on the sides of the front case 101 and the rear case 102, such as sides 158 and 159, respectively.

The user input unit 130 described previously with respect to FIG. 1 can be configured to receive a command for controlling an operation of the mobile terminal 100 and can include one or more user input modules 130a and 130b shown in FIG. 2A. The user input modules 130a and 130b can each be referred to as a "manipulation unit" and can be configured to employ various methods and techniques of tactile manipulation and response to facilitate operation by the user.

The user input modules 130a and 130b can be configured for inputting different commands relative to one another. For example, the user input module 130a can be configured allow a user to input such commands as "start," "end," and "scroll" to the mobile terminal 100. The user input module 130b can allow a user to input a command for adjusting the volume of the audio output unit 152 or a command for switching to a touch recognition mode of the display unit 151.

Figure 2B:
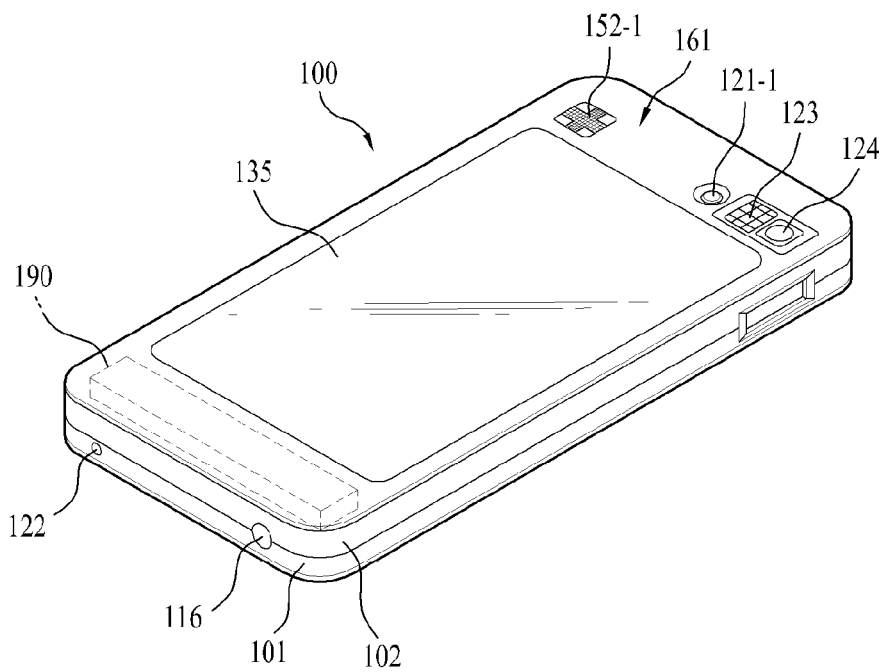
FIG. 2B is a rear perspective view of the mobile terminal in accordance with one embodiment of the present invention.

FIG. 2B is a rear perspective view of the mobile terminal 100 in accordance with one embodiment of the present invention. As shown in FIG. 2B, a camera 121-1 can be additionally located on a rear surface 161 of the rear case 102. The camera 121-1 has a direction of view that is substantially opposite to the direction of view of the camera 121 shown in FIG. 2A. The cameras 121 and 121-1 can have different resolutions, or different pixels counts, with respect to one another.

For example, the camera 121 can operate with a relatively lower resolution than the camera 121-1 in order to capture an image of the user to allow immediate transmission of the image to another user in real-time for a video call, whereas the camera 121-1 can operate with a relatively higher resolution than the camera 121 to capture images of general objects with high picture quality, which may not require immediate transmission in real-time, and may be stored for later viewing or use. For example, the cameras 121 and the camera 121-1 can be configured to rotate or to pop-up on the mobile terminal 100.

Additional camera related components, such as a flash 123 and a mirror 124, can be located adjacent to the camera 121-1. When an image of a subject is captured with the camera 121-1, the flash 123 illuminates the subject. The mirror 124 allows self-image capturing by allowing the user to see himself when the user desires to capture his own image using the camera 121-1.

The rear surface 161 of the rear case 102 can further include a second audio output module 152-1. The second audio output module 152-1 can support a stereo sound function in conjunction with the audio output module 152 shown in FIG. 2A and can be used for communication during a phone call when the mobile terminal 100 is in a speaker phone mode.

A broadcasting signal receiving antenna 116 can be additionally attached to the side of the body of the mobile terminal 100 in addition to an antenna used for telephone calls. The broadcasting signal receiving antenna 116 can form a part of the broadcast receiving module 111 shown in FIG. 1, and can be set in the body of the mobile terminal 100 such that the broadcasting signal receiving antenna can be pulled out and retracted into the body of the mobile terminal 100.

FIG. 2B shows the power supply unit 190 for providing power to the mobile terminal 100. For example, the power supply unit 190 can be situated either inside the mobile terminal 100 or detachably coupled to the mobile terminal 100.

As shown in FIG. 2B, a touch pad 135 for sensing a touch by the user can be located on the rear surface 161 of the rear case 102. In one embodiment, the touch pad 135 and the display unit 151 can be translucent such that the information displayed on display unit 151 can be output on both sides of the display unit 151 and can be viewed through the touch pad 135. The information displayed on the display unit 151 can be controlled by the touch pad 135. In another embodiment, a second display unit in addition to display unit 151 illustrated in FIG. 2A can be located on the rear surface 161 of the rear case 102 and combined with the touch pad 135 to form a touch screen on the rear case 102.

The touch pad 135 is activated by interconnecting with the display unit 151 of the front case 101. The touch pad 135 can be located in parallel with the display unit 151 and behind the display unit 151. The touch pad 135 can have the same or smaller size than the display unit 151.

In the following description, a process for controlling a display operation of a trajectory line and/or a screen to facilitate the trajectory line of a touch gesture, which is inputted to a screen of a touchscreen, to be discriminated from the screen according to the present invention is explained in detail.

First of all, a process for setting a touch gesture according to the present invention is described with reference to FIGS. 3 to 7.

Figure 3:
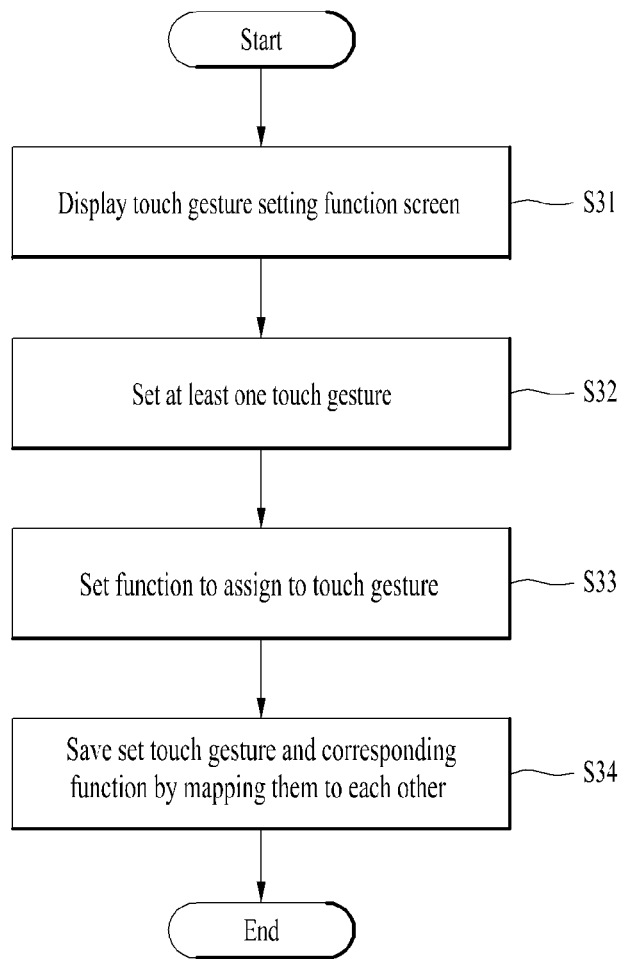
FIG. 3 is a flowchart of a process for setting a touch gesture according to the present invention.

FIG. 3 is a flowchart of a process for setting a touch gesture according to the present invention.

FIGS. 4 to 7 are diagrams for screen configurations of a process for setting a touch gesture according to the present invention.

Referring to FIG. 3, if a touch gesture setting function is selected from various functions provided to the mobile terminal 100 via the touchscreen 151 or the user input unit 130, the controller 180 executes the touch gesture setting function and then displays an executive screen of the executed touch gesture setting function [S31].

In this case, the touch gesture setting function is the function of mapping a specific function of the mobile terminal 100 to a touch gesture having a specific pattern. If a touch gesture set via the touch gesture setting function is inputted to the touchscreen 151, the controller 180 may perform a search for a function mapped to the inputted touch gesture and then executes the found function.

If a user sets up a touch gesture to set and a function to assign to the touch gesture are set in the touch gesture setting function executed screen via the touchscreen 151 or the user input unit 130 [S32, S33], the controller 180 maps the set touch gesture and the set function to each other and then saves them in the memory 160 [S34].

Figure 4:
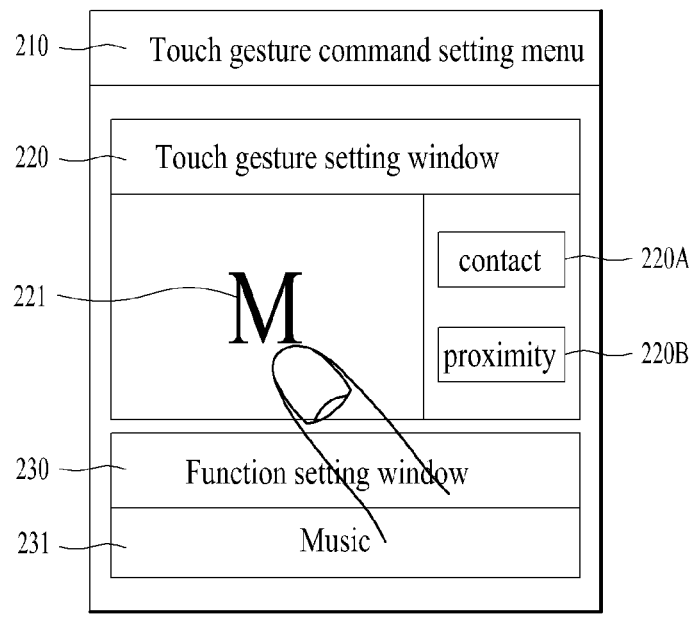
FIGS. 4 to 7 are diagrams for screen configurations of a process for setting a touch gesture according to the present invention.
Figure 4:
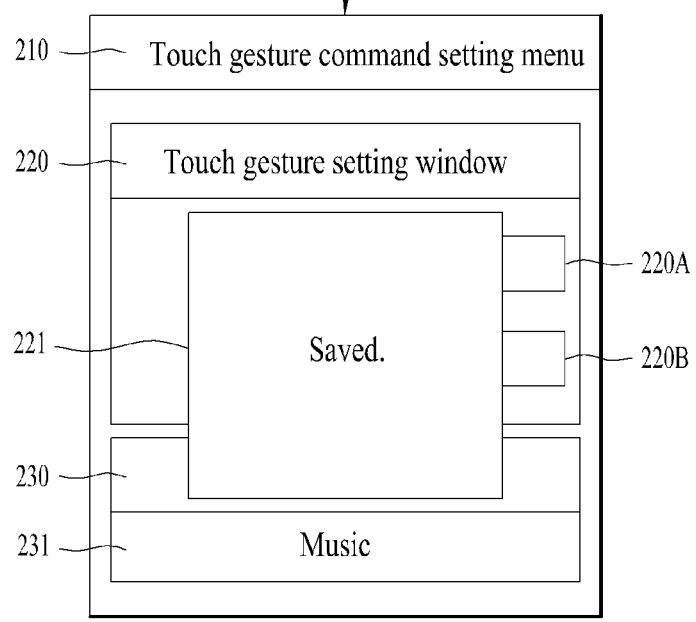

FIG. 4 (a) shows an executive screen 210 of the touch gesture setting function described with reference to FIG. 3 and shows that a touch gesture setting window 220 and a function setting window 230 are contained in the executive screen 210.

In particular, a $1^{st}$ setting window 220A for a contact touch setting and a $2^{nd}$ setting window 220B for a proximity setting are contained in the touch gesture setting window 220.

If a user selects the $1^{st}$ setting window 220A, the controller 180 may recognize a pattern of a user's contact touch inputted by a contact with the touchscreen 151. If a user selects the $2^{nd}$ setting window 220B, the controller activates the proximity sensor 141 and then recognizes a pattern of a user's proximity touch inputted to the touchscreen 151.

Therefore, a user may be able to set a type of an input-desirable touch gesture to a contact touch gesture or a proximity touch gesture though a selection of the $1^{st}$ setting window 220A or the $2^{nd}$ setting window 220B.

After the user's touch gesture 221 has been inputted via the touch gesture setting window 220, if the user sets a specific function 231 via the function setting window 230, referring to FIG. 4B, the controller 180 maps the set touch gesture and the set function to each other and then saves them in the memory 160.

In dong so, the user may be able to assign all functions provided to the mobile terminal 100 to the touch gesture 221 inputted by the user via the function setting window 230.

For instance, FIG. 4 shows that the function is a music application executing function, by which types of functions settable via the function setting window 230 may be non-limited.

In particular, the functions settable via the function setting window 230 of the present invention may include every executable content provided to the mobile terminal 100, a manipulating function related to a content, a menu, a manipulating function related to a menu, an operating mode change (e.g., a switching to a home screen mode from a specific function executive mode, a switching to a standby screen mode from a specific function executive mode, etc.) of the mobile terminal 100 and the like. And, the content may include such data manipulated and used by a user in the mobile terminal as a phonebook, a message, a music file, a video file, an image file, a schedule, contact information, a document file, an operating system and the like.

Figure 5:
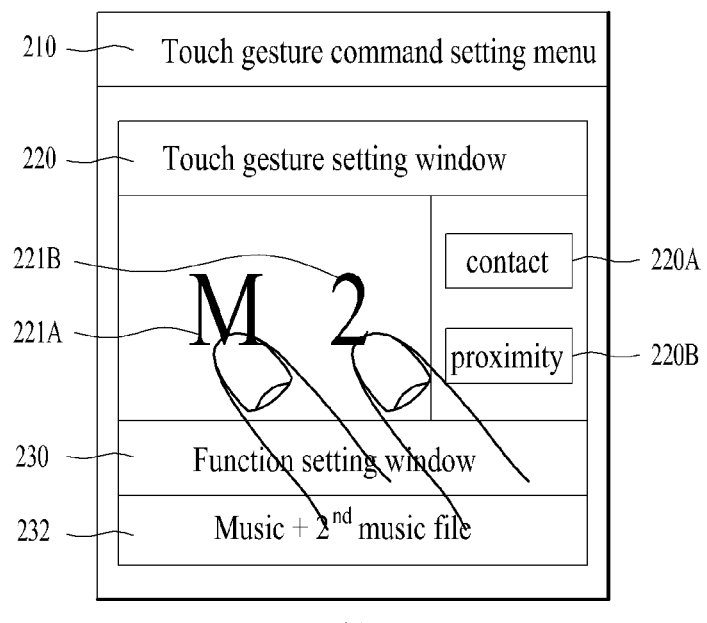
Figure 5:
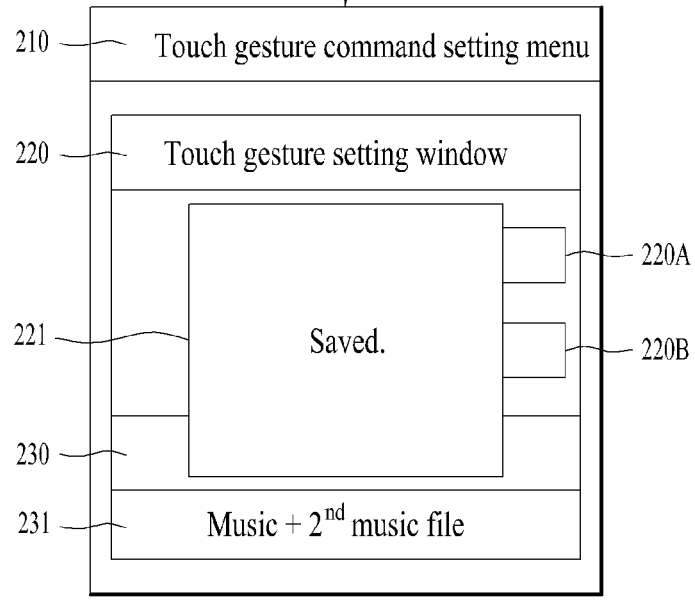

FIG. 5 shows a process for mapping at least 2 functions to at least 2 touch gestures and then saving the mapped functions and touch gestures.

Referring to FIG. 5, after independent $1^{st}$ and $2^{nd}$ touch gestures 221A and 221B of different patterns have been inputted via a touch gesture setting window 220, if $1^{st}$ and $2^{nd}$ functions respectively assigned to the $1^{st}$ and $2^{nd}$ touch gesture 221A and 221B are set via a function setting window 230 [FIG. 5 (*a*)], the controller 180 controls the $1^{st}$ and $2^{nd}$ functions to be mapped to the set $1^{st}$ and $2^{nd}$ touch gestures 221A and 221B, respectively, and then controls them to be saved in the memory 160 [FIG. 5 (*b*)].

In doing so, both of the $1^{st}$ and $2^{nd}$ touch gestures 221A and 221B may include contact touch gestures or proximity touch gestures. Alternatively, either the $1^{st}$ touch gesture 221A or the $2^{nd}$ touch gesture 221B may include a contact touch gesture while either the $2^{nd}$ touch gesture 221B or the $1^{st}$ touch gesture 221A is a proximity touch gesture.

Moreover, one of the $1^{st}$ function assigned to the $1^{st}$ touch gesture 221A and the $2^{nd}$ function assigned to the $2^{nd}$ touch gesture 221B includes a main function, while the other includes a sub-function subordinate to the main function. For instance, a function assigned to the $1^{st}$ touch gesture 221A includes a music application executing function. And, a function assigned to the $2^{nd}$ touch gesture 221B includes a sub-function for the music application executing function, which can include a function of playing back a $2^{nd}$ music file in a play list of the music application. In particular, if the $1^{st}$ and $2^{nd}$ touch gestures 221A and 221B are inputted to the screen, the controller 180 executes the music application and simultaneously plays back the $2^{nd}$ music file in the play list of the music application.

Besides, the $1^{st}$ and $2^{nd}$ functions respectively assigned to the $1^{st}$ and $2^{nd}$ touch gestures 221A and 221B may include independent functions not associated with each other.

For instance, an executing function of a $1^{st}$ content may be assigned to the $1^{st}$ touch gesture 221A and an executing function of a $2^{nd}$ content may be assigned to the $2^{nd}$ touch gesture 221B. In this case, if the $2^{nd}$ touch gesture 221B is inputted to an executive screen of the $1^{st}$ content, the controller 180 ends the executive of the $1^{st}$ content, executes the $2^{nd}$ content assigned to the $2^{nd}$ touch gesture 221B, and then displays an executive screen of the $2^{nd}$ content. Moreover, if the $1^{st}$ touch gesture 221A is inputted to an executive screen of the $2^{nd}$ content, the controller 180 ends the executive of the $2^{nd}$ content, executes the $1^{st}$ content assigned to the $1^{st}$ touch gesture 221A, and then displays an executive screen of the $1^{st}$ content.

An operation control function of a $1^{st}$ content may be assigned to the $1^{st}$ touch gesture 221A, while an operation control function of a $2^{nd}$ content may be assigned to the $2^{nd}$ touch gesture 221B. In this case, while both of the $1^{st}$ and $2^{nd}$ contents are simultaneously execute (i.e., in multitasking mode), if the $2^{nd}$ touch gesture 221B is inputted to a currently-displayed executive screen of the $1^{st}$ content, the controller 180 does not switch the executive screen of the $1^{st}$ content to an executive screen of the $2^{nd}$ content but may be able to reflect the operation control function assigned to the $2^{nd}$ touch gesture 221B on the $2^{nd}$ content. Moreover, while both of the $1^{st}$ and $2^{nd}$ contents are simultaneously execute (i.e., in multitasking mode), if the $1^{st}$ touch gesture 221A is inputted to a currently-displayed executive screen of the $2^{nd}$ content, the controller 180 does not switch the executive screen of the $2^{nd}$ content to an executive screen of the $1^{st}$ content but may be able to reflect the operation control function assigned to the $1^{st}$ touch gesture 221A on the $1^{st}$ content.

For instance, assuming that the $1^{st}$ content is music, that an operation control function of a video assigned to the $1^{st}$ touch gesture 221A is a volume-up, that the $2^{nd}$ content is a document, and that an operation control function assigned to the $2^{nd}$ touch gesture 221B is a page shift, while a play of the music and a display of the document are simultaneously execute, if the $1^{st}$ touch gesture 221A is inputted to a screen having the document displayed thereon, the controller 180 may be able to raise the volume of the currently played music without switching the document displayed screen to the music play screen.

While both of the $1^{st}$ and $2^{nd}$ contents are simultaneously execute, if both of the $1^{st}$ and $2^{nd}$ touch gestures 221A and 221B are inputted to a currently-displayed executive screen of the $1^{st}$ content together, the controller 180 may be able to simultaneously reflect the operation control functions of the $1^{st}$ and $2^{nd}$ contents respectively assigned to the $1^{st}$ and $2^{nd}$ touch gestures 221A and 221B on the $1^{st}$ and $2^{nd}$ contents, respectively.

For instance, assuming that the $1^{st}$ content is music, that an operation control function of a video assigned to the $1^{st}$ touch gesture 221A is a volume-up, that the $2^{nd}$ content is a document, and that an operation control function assigned to the $2^{nd}$ touch gesture 221B is a page shift, while a play of the music and a display of the document are simultaneously execute, if both of the $1^{st}$ and $2^{nd}$ touch gestures 221A and 221B are inputted together to a screen having the document displayed thereon, the controller 180 may shift a current page displayed on the screen to a next or previous page and may simultaneously raise the volume of the currently played music.

Figure 6:
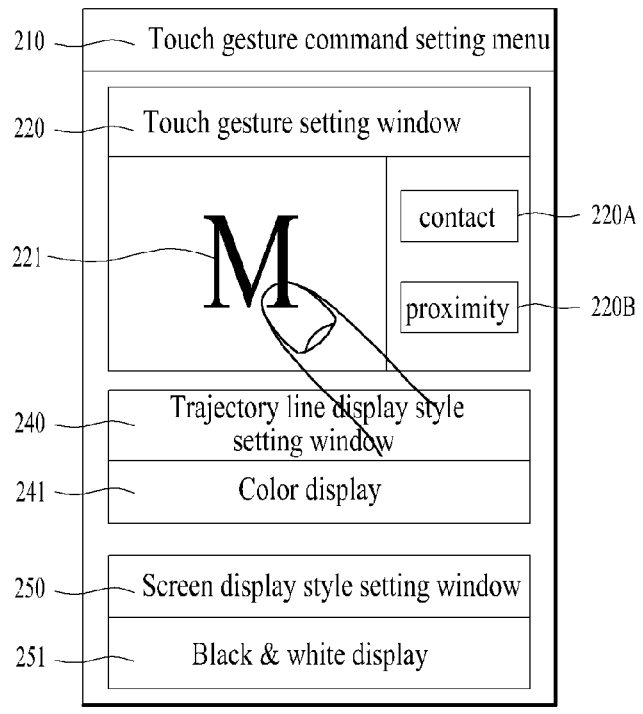
Figure 6:
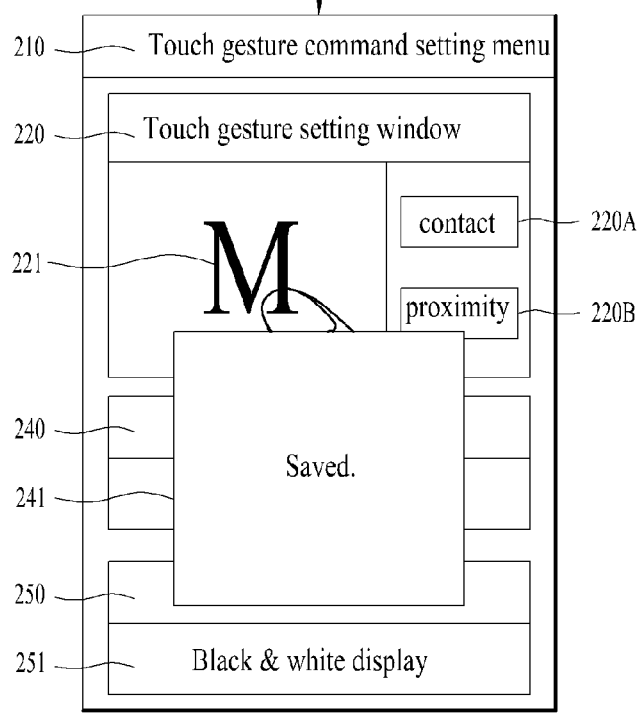

FIG. 6 is a diagram of screen configurations to show a process for setting a trajectory line of a touch gesture set by one of the processes shown in FIGS. 3 to 5 and a display style of a screen.

Referring to FIG. 6 (*a*), if at least one touch gesture having a specific function assigned thereto is set by one of the processes shown in FIGS. 3 to 5, the controller 180 may display a trajectory line display style setting window 240 for setting a trajectory line of the set touch gesture and a screen display style setting window 250 for setting a display style of a screen in response to a request made by a user.

In particular, when the touch gesture set in one of FIGS. 3 to 5 is inputted to the screen, the trajectory line display style setting window 240 and the screen display style setting window 250 are the setting window for setting a trajectory line of the touch gesture to be well discriminated in the screen and the setting window for setting a display style of the screen to enable the trajectory line to be well discriminated in the screen as well, respectively.

In doing so, using the trajectory line display style setting window 240 and the screen display style setting window 250, a user may be able to set the trajectory line and the display style of the screen in order for the trajectory line to be well discriminated in the screen, as shown in $1^{st}$ to $6^{th}$ embodiments of the present invention explained in the following description.

If a user sets the trajectory line and the display style of the screen via the trajectory line display style setting window 240 and the screen display style setting window 250, referring to FIG. 6 (*b*), the controller 180 may save the set trajectory line and the set display style of the screen.

If the touch gesture set by one of the processes described with reference to FIGS. 3 to 5 is inputted to the screen, the controller 180 may apply the display style set by the process described with reference to FIG. 6 to the screen to which the trajectory line of the touch gesture and the touch gesture are inputted.

For instance, referring to FIG. 6, the display style of the trajectory line is set to 'color display' 241 and the display style of the screen is set to 'black & white display' 251.

If a touch gesture is inputted to the screen, the controller 180 displays a background of the screen in black & white and also displays a trajectory line of the gesture inputted to the screen in color, whereby the trajectory line can be discriminated well.

Figure 7:
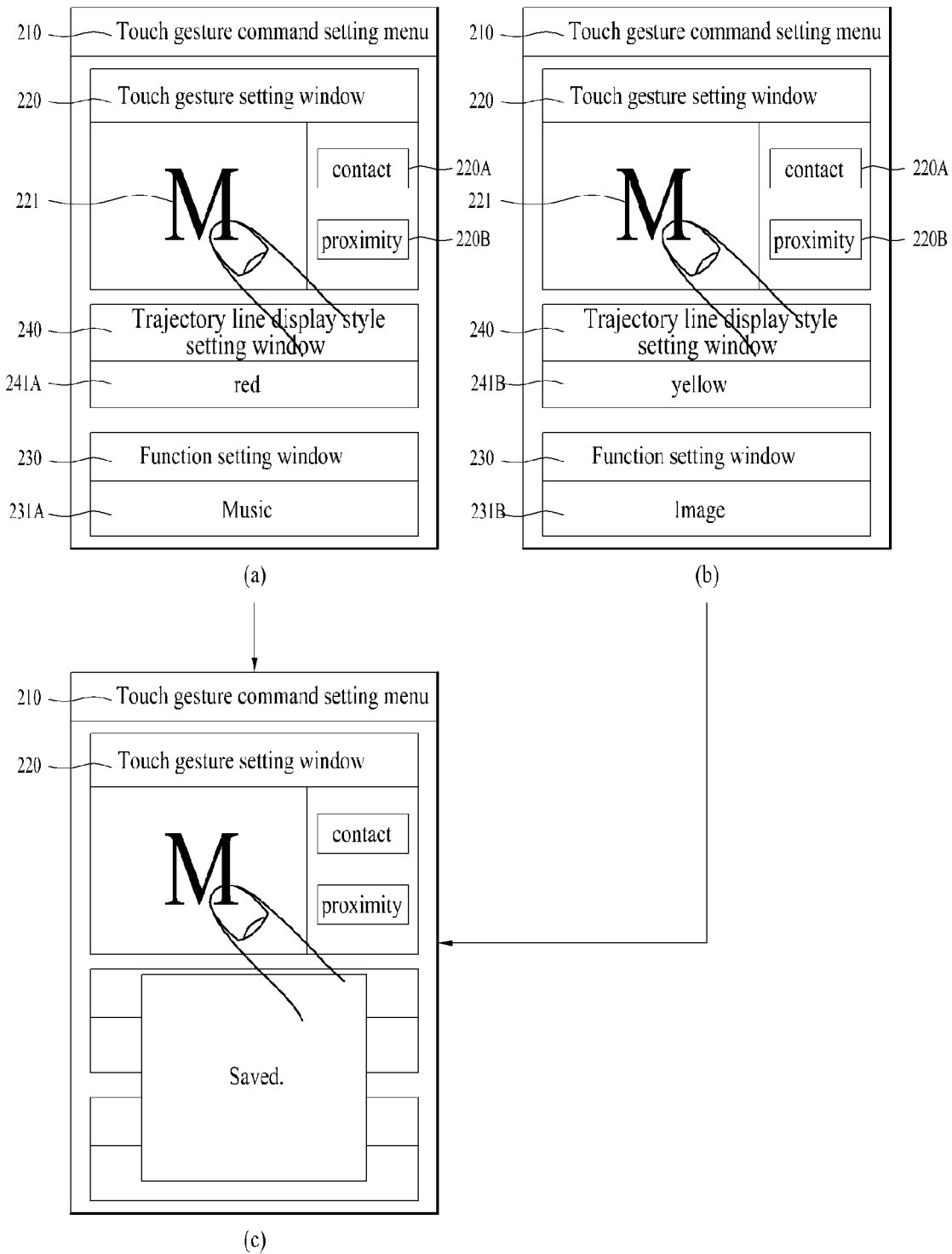

FIG. 7 is a diagram for screen configurations for a process for setting different trajectory line display styles and different functions for touch gestures of the same pattern, respectively.

Referring to FIG. 7 (a), a $1^{st}$ touch gesture 221 having a specific pattern is set via a touch gesture setting window 220, a color of a trajectory line of the $1^{st}$ touch gesture 221 is set to a $1^{st}$ color 241A via a trajectory line display style setting window 240, and a function to be assigned to the $1^{st}$ touch gesture 221 is set to a $1^{st}$ function 231A via a function setting window 230. If so, referring to FIG. 7 (c), the controller 180 maps the set $1^{st}$ touch gesture 221, the set $1^{st}$ color 241A and the set $1^{st}$ function 231A to each other and then saves them in the memory 160.

For instance, FIG. 7 (a) shows that a trajectory line color of the $1^{st}$ touch gesture 221 is set to 'red' 241A and that a function to be assigned to the $1^{st}$ touch gesture 221 is set to 'music player function' 231A.

Referring to FIG. 7 (b), a $2^{nd}$ touch gesture 221 identical to the $1^{st}$ touch gesture 221 is set via a touch gesture setting window 220, a color of a trajectory line of the $2^{nd}$ touch gesture 221 is set to a $2^{nd}$ color 241B via a trajectory line display style setting window 240, and a function to be assigned to the $2^{nd}$ touch gesture 221 is set to a $2^{nd}$ function 231B via a function setting window 230. If so, referring to FIG. 7 (c), the controller 180 maps the set $2^{nd}$ touch gesture 221, the set $2^{nd}$ color 241B and the set $2^{nd}$ function 231B to each other and then saves them in the memory 160.

For instance, FIG. 7 (b) shows that a trajectory line color of the $2^{nd}$ touch gesture 221 is set to 'yellow' 241B and that a function to be assigned to the $2^{nd}$ touch gesture 221 is set to 'image viewer function' 231B. If a user inputs the $1^{st}$ touch gesture having a trajectory line set to 'red' 241A is inputted to the screen, the controller 180 may be able to execute the 'music player function' 231A assigned to the $1^{st}$ touch gesture.

For another instance, if a user inputs the $2^{nd}$ touch gesture, which is identical to the $1^{st}$ touch gesture, having a trajectory line set to 'yellow' 241B is inputted to the screen, the controller 180 may be able to execute the 'image viewer function' 231B assigned to the $2^{nd}$ touch gesture.

In particular, referring to FIG. 7, the same touch gesture may provide a function differing in accordance with a user-set display style of a trajectory line.

In doing so, the user may be able to set the trajectory line display types of the $1^{st}$ and $2^{nd}$ touch gestures equal to each other to differ from each other in at least one of brightness, display mode (e.g., color, black & white), transparency, line boldness, dimension (e.g., 3D, 2D), display color and the like via the trajectory line display style setting window 240.

As mentioned in the foregoing description, the touch gesture setting process according to the present invention has been explained in detail with reference to FIGS. 3 to 7.

In the following description, a process for controlling a trajectory line of a touch gesture inputted to a screen of a touchscreen to be discriminated well on the touchscreen according to the present invention is explained in detail with reference to FIGS. 8 to 21.

Figure 8:
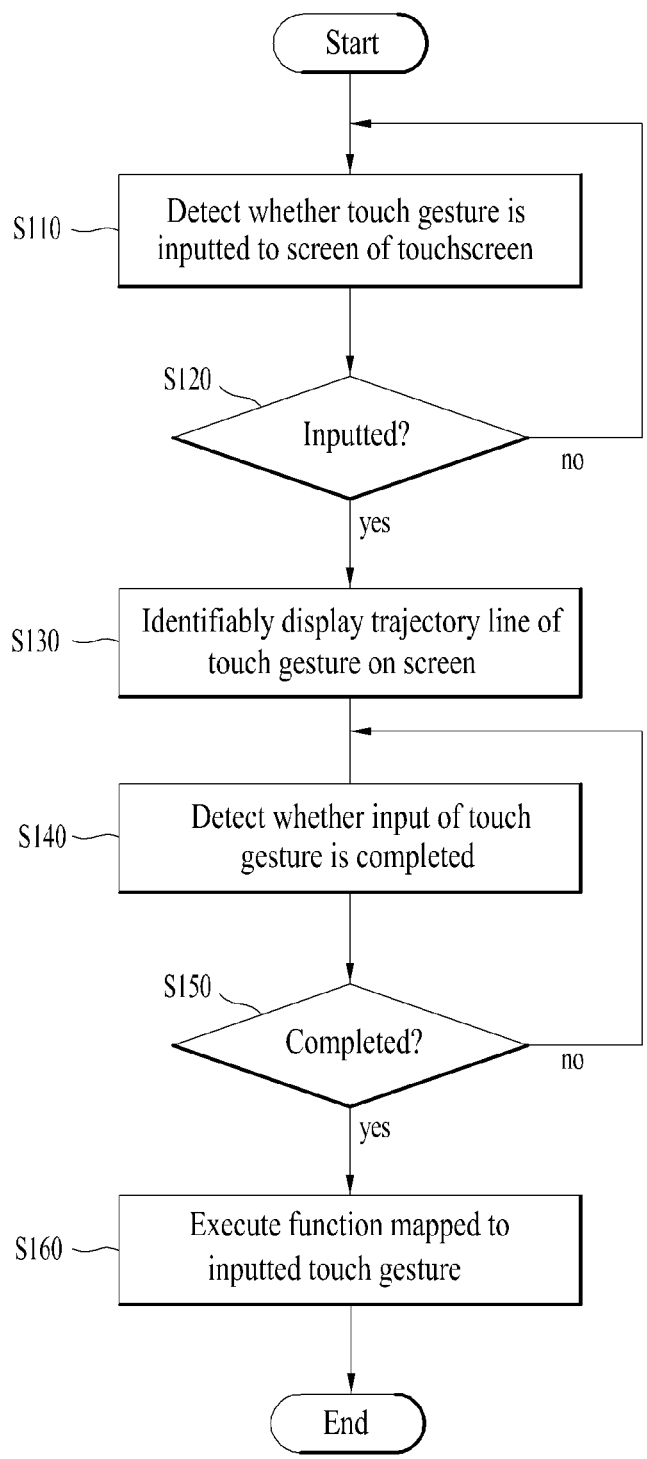
FIG. 8 is a flowchart of a process for controlling a display style of a touch gesture trajectory line and a display style of a screen according to the present invention.

FIG. 8 is a flowchart of a process for controlling a trajectory line of a touch gesture inputted to a screen of a touchscreen to be discriminated well on the touchscreen according to the present invention.

Referring to FIG. 8, the controller 180 detects whether at least one touch gesture is inputted to a screen of the touchscreen 151 [S110]. If the at least one touch gesture is inputted to the screen of the touchscreen 151 [S120], the controller 180 may display a trajectory line indicating a trajectory of the inputted touch gesture on the screen and control the trajectory line to be well discriminated on the screen [S130].

In doing so, the touch gesture may include a contact touch gesture or a proximity touch gesture.

Meanwhile, the controller 180 may change a display style of the trajectory line or the screen in order for the trajectory line to be discriminated well on the screen. In particular, the controller 180 changes the display styles of the trajectory line and the screen to differ from each other, thereby enabling the trajectory line to be well discriminated on the screen.

The controller 180 applies the display styles of the trajectory line and the screen, which are set different from each other by the above-mentioned process shown in FIG. 6, to the trajectory line and the screen, thereby enabling the trajectory line to be well discriminated on the screen.

The process for the trajectory line to be well discriminated on the screen shall be explained in detail in the description of $1^{st}$ to $6^{th}$ embodiments of the present invention later.

While the trajectory line of the inputted touch gesture is controlled to be well discriminated on the screen, the controller 180 detects whether the input of the touch gesture is completed.

In doing so, if the inputted touch gesture is a touch gesture directly coming into contact with the screen, when the contact of the touch gesture is released from the screen, the controller 180 may determine that the input of the touch gesture has been completed. Moreover, the controller 180 controls an icon, to which a completion function of the inputted contact touch gesture is assigned, to be displayed on the screen. After the contact touch gesture has been inputted, if the icon is touched, the controller 180 may determine that the input of the contact touch gesture has been completed.

In doing so, if the inputted touch gesture is a proximity gesture proximate to the screen, when a proximity depth of the proximity touch gesture to the screen gets away from the screen in a distance farther than a preset depth in direction opposite to the screen, the controller 180 may determine that the input of the touch gesture has been completed. Moreover, the controller 180 controls an icon, to which a completion function of the inputted proximity touch gesture is assigned, to be displayed on the screen. After the proximity touch gesture has been inputted, if the icon is touched, the controller 180 may determine that the input of the proximity touch gesture has been completed.

Thus, if the input of the touch gesture is completed [S150], the controller 180 does not display a trajectory line of the touch gesture, searches the memory 160 for a function mapped to the touch gesture, and then executes the found function [S160].

In the following description, embodiments according to the process shown in FIG. 8 are explained in detail with reference to FIGS. 9 to 21.

Of course, $1^{st}$ to $13^{th}$ embodiments mentioned in the following description may be performed independently. Optionally, contents of the 1st to 13th embodiments may be performed in a manner of being connected and/or combined with each other entirely or in part.

1st Embodiment

1st embodiment of the present invention relates to a process for discriminating a trajectory line of a touch gesture well on a screen in a manner of differentiating the trajectory line of the touch gesture and the screen from each other in brightness.

A 1st embodiment of the present invention is described in detail with reference to FIG. 9 as follows.

Figure 9:
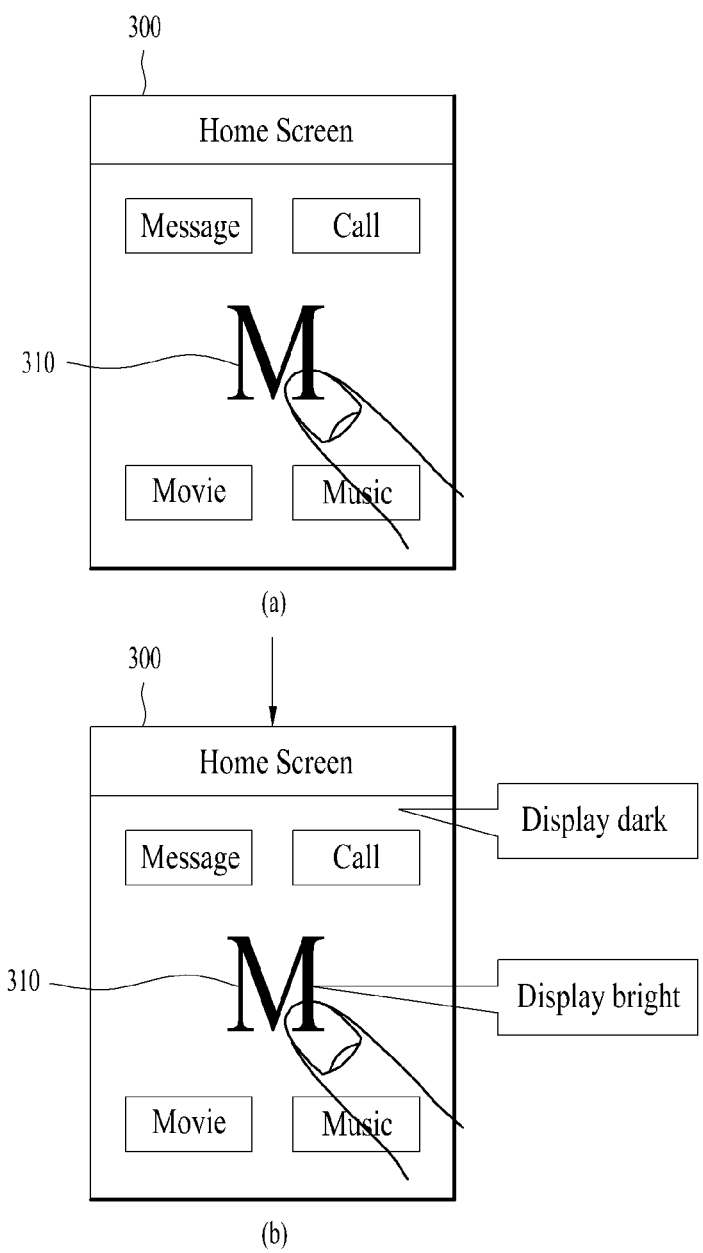
FIG. 9 is a diagram for screen configurations of a process for controlling a display style of a touch gesture trajectory line and a display style of a screen according to a $1^{st}$ embodiment of the present invention.

FIG. 9 is a diagram for screen configurations of a process for controlling a display style of a touch gesture trajectory line and a display style of a screen according to a 1st embodiment of the present invention.

Referring to FIG. 9, if a user's touch gesture is inputted to a screen 300 of a touchscreen [FIG. 9 (a)], the controller 180 displays a trajectory line having the same shape 'M' of a pattern of the inputted touch gesture [FIG. 9 (b)].

FIG. 9 (a) shows that the screen 300 is a home screen containing a plurality of applications, by which a type of the screen 300 may be non-limited.

Alternatively, the screen 300 may include one of all screens displayable on a mobile terminal 100.

Meanwhile, when the trajectory line 310 is displayed, the controller 180 recognizes a current brightness of the screen 300 and then enables a user to discriminate the trajectory line 310 well on the screen 300 in a manner that a brightness of the trajectory line 310 is set higher than that of the recognized brightness of the screen 300.

Alternatively, when the trajectory line 310 is displayed, the controller 180 recognizes a current brightness of the trajectory line 310 and then enables a user to discriminate the trajectory line 310 well on the screen 300 in a manner that a brightness of the screen 300 is set higher than that of the recognized brightness of the trajectory line 310.

In case that the brightness of the trajectory line 310 and the brightness of the screen 300 are already set in the memory 160 via the trajectory line display style setting window 240 and the screen display style setting window 250 described with reference to FIG. 6, the controller 180 may display the trajectory line 310 and the screen 300 with the brightness set in the memory 160.

Meanwhile, if the input of the touch gesture is completed, the controller 180 does not display the trajectory line 310 on the screen 300, changes the brightness of the screen 300 into an original brightness, searches the memory 160 for a function mapped to the corresponding touch gesture, and then executes the found function.

2nd Embodiment

2nd embodiment of the present invention relates to a process for discriminating a trajectory line of a touch gesture well on a screen in a manner of displaying the trajectory line of the touch gesture in color or black & white and the screen in black & white or color.

A 2nd embodiment of the present invention is described in detail with reference to FIG. 10 as follows.

Figure 10:
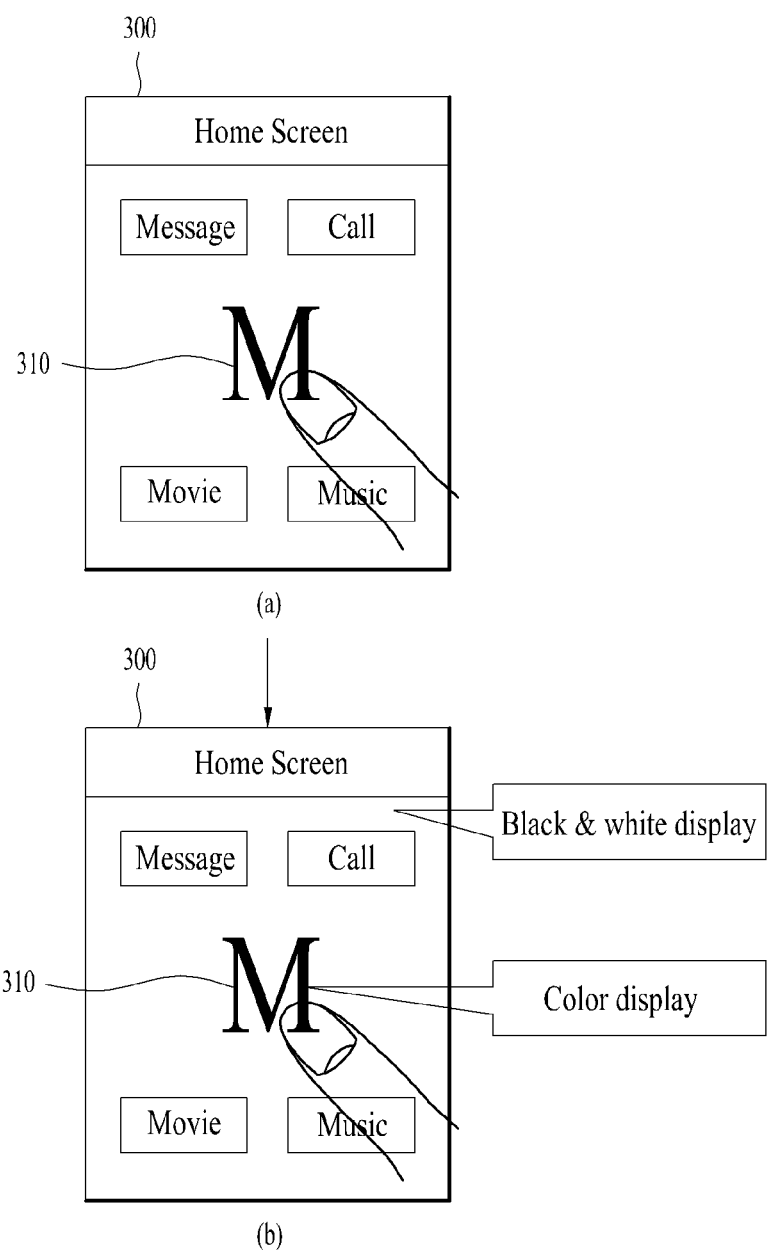
FIG. 10 is a diagram for screen configurations of a process for controlling a display style of a touch gesture trajectory line and a display style of a screen according to a $2^{nd}$ embodiment of the present invention.

FIG. 10 is a diagram for screen configurations of a process for controlling a display style of a touch gesture trajectory line and a display style of a screen according to a 2nd embodiment of the present invention.

Referring to FIG. 10, if a user's touch gesture is inputted to a screen 300 of a touchscreen [FIG. 10 (a)], the controller 180 displays a trajectory line having the same shape 'M' of a pattern of the inputted touch gesture [FIG. 10 (b)].

In doing so, when the trajectory line 310 is displayed, the controller 180 may control the trajectory line 310 to be discriminated well on the screen 300 by the user in a manner of controlling the trajectory line 310 to be displayed in a preset color and also controlling the screen to be displayed in black & white.

Alternatively, the controller 180 may control the trajectory line 310 to be discriminated well on the screen by the user in a manner of controlling the screen 300 to be displayed in an original color and also controlling the trajectory line 310 to be displayed in black & white.

In case that a display style of the trajectory line 310 is set in advance to color or black & white via the trajectory line display style setting window 240 described with reference to FIG. 6 and that a display style of the screen 300 is set in advance to black & white or color via the screen display style setting window 250 described with reference to FIG. 6, the controller 180 may control the trajectory line 310 to be displayed in color and may also control the screen 300 to be displayed in black & white.

Meanwhile, if the input of the touch gesture is completed, the controller 180 controls the trajectory line 310 not to be displayed on the screen 300. If the screen 300 is displayed in black & white, the controller 180 controls the screen 300 to be displayed in original color, searches the memory 160 for a function mapped to the touch gesture, and then executes the found function.

3rd Embodiment

3rd embodiment of the present invention relates to a process for discriminating a trajectory line of a touch gesture well on a screen in a manner of displaying a background of a screen, on which the trajectory line of the touch gesture is displayed, semi-transparently.

A 3rd embodiment of the present invention is described in detail with reference to FIG. 11 as follows.

Figure 11:
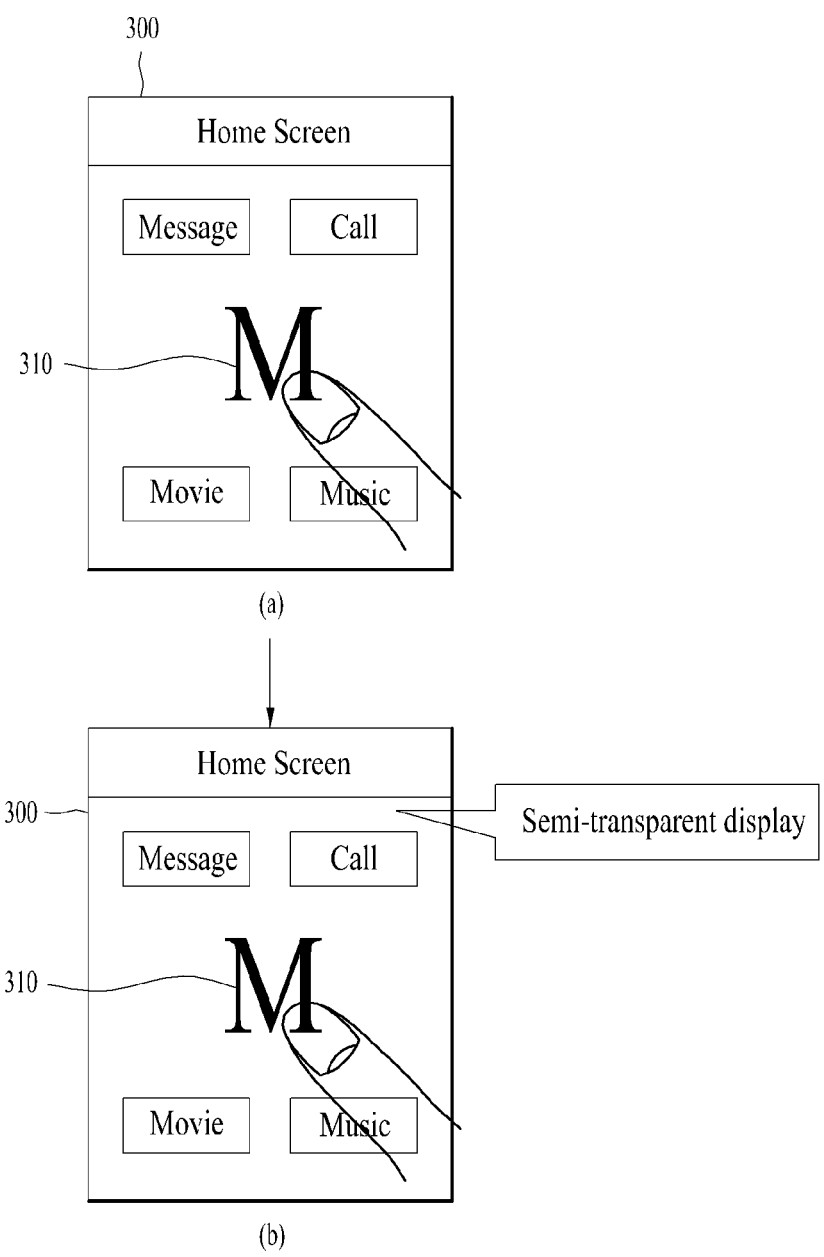
FIG. 11 is a diagram for screen configurations of a process for controlling a display style of a touch gesture trajectory line and a display style of a screen according to a $3^{rd}$ embodiment of the present invention.

FIG. 11 is a diagram for screen configurations of a process for controlling a display style of a touch gesture trajectory line and a display style of a screen according to a 3rd embodiment of the present invention.

Referring to FIG. 11, if a user's touch gesture is inputted to a screen 300 of a touchscreen [FIG. 11 (a)], the controller 180 displays a trajectory line having the same shape 'M' of a pattern of the inputted touch gesture [FIG. 11 (b)].

In doing so, when the trajectory line 310 is displayed on the screen 300, the controller 180 controls a background within the screen 300 to be semi-transparently displayed, thereby enabling a user to discriminate the trajectory line 310 well in the screen 300.

In case that either a display style of the trajectory line 310 or a display style of the screen 300 is set in advance to 'semi-transparent' via the trajectory line display style setting window 240 described with reference to FIG. 6 or the screen display style setting window 250 described with reference to FIG. 6 or that transparency of each of the trajectory line 310 and the screen 300 is set, the controller 180 may control the trajectory line 310 and the screen 300 to be displayed at the set transparency.

Meanwhile, if the input of the touch gesture is completed, the controller 180 controls the trajectory line 310 not to be displayed on the screen 300, changes the semi-transparently displayed screen 300 into the original screen, searches the memory 160 for a function mapped to the touch gesture, and then executes the found function.

4th Embodiment

4th embodiment of the present invention relates to a process for discriminating a trajectory line of a touch gesture well on a screen in a manner of differentiating the trajectory line of the touch gesture and the screen from each other in color boldness.

A 4th embodiment of the present invention is described in detail with reference to FIG. 12 as follows.

Figure 12:
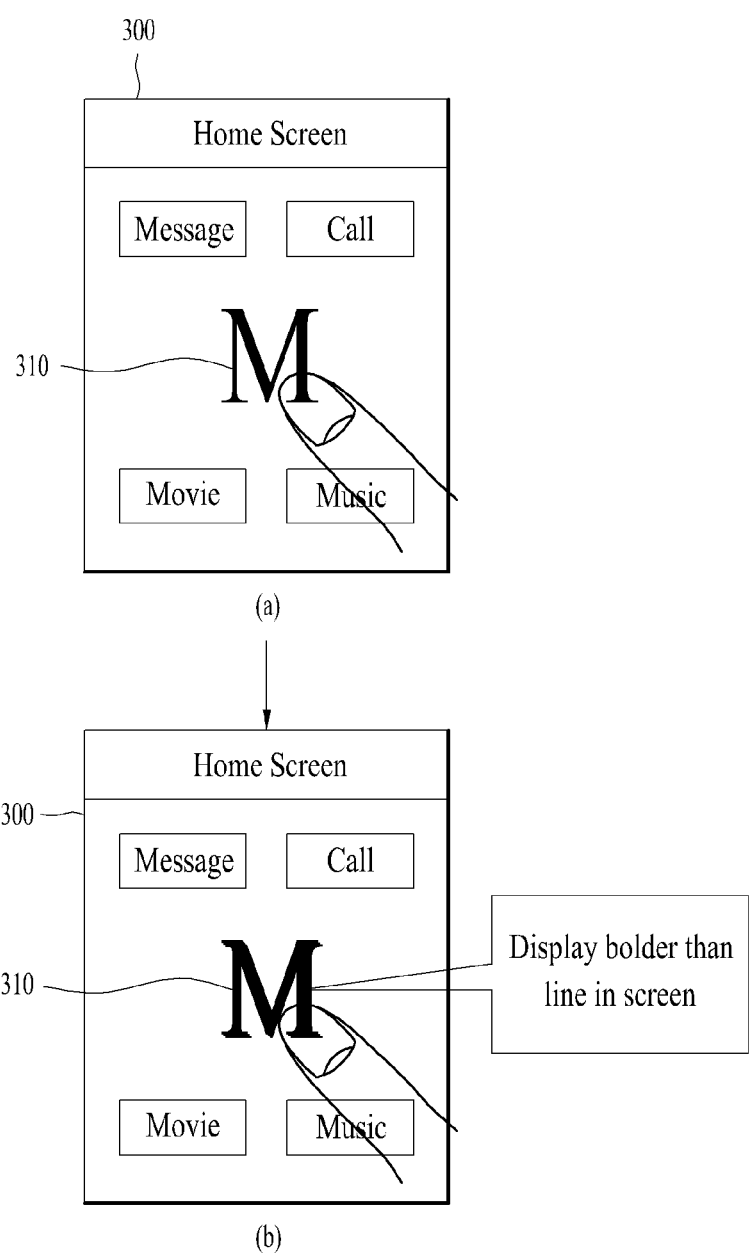
FIG. 12 is a diagram for screen configurations of a process for controlling a display style of a touch gesture trajectory line and a display style of a screen according to a $4^{th}$ embodiment of the present invention.

FIG. 12 is a diagram for screen configurations of a process for controlling a display style of a touch gesture trajectory line and a display style of a screen according to a 4th embodiment of the present invention.

Referring to FIG. 12, if a user's touch gesture is inputted to a screen 300 of a touchscreen [FIG. 12 (*a*)], the controller 180 displays a trajectory line having the same shape 'M' of a pattern of the inputted touch gesture [FIG. 12 (*b*)].

In doing so, when the trajectory line 310 is displayed, the controller 180 may control the trajectory line 310 to be discriminated well on the screen 300 by the user in a manner of recognizing boldness of a line contained in a current screen 300 and then setting boldness of the trajectory line 310 to be greater than the recognized boldness of the line contained in the screen 300.

Alternatively, the controller 180 may control the trajectory line 310 to be discriminated well on the screen 300 by the user in a manner of recognizing boldness of the trajectory line 310 and then setting boldness of a line contained in the screen 300 to be smaller than the recognized boldness of the trajectory line 310.

In case that a line boldness of the trajectory line 310 is set in advance via the trajectory line display style setting window 240 described with reference to FIG. 6 and that a line boldness of the screen 300 is set in advance via the screen display style setting window 250 described with reference to FIG. 6, the controller 180 may control the trajectory line 310 to be displayed with the set line boldness and may also control the screen 300 to be displayed with the set line boldness.

Meanwhile, if the input of the touch gesture is completed, the controller 180 controls the trajectory line 310 not to be displayed on the screen 300, changes the boldness of the line in the screen into an original boldness, searches the memory 160 for a function mapped to the touch gesture, and then executes the found function.

5th Embodiment

5th embodiment of the present invention relates to a process for discriminating a trajectory line of a touch gesture well on a screen in a manner of displaying the trajectory line of the touch gesture in 3D (3-dimension) or 2D (2-dimension) and the screen in 2D or 3D.

A 5th embodiment of the present invention is described in detail with reference to FIG. 13 as follows.

Figure 13:
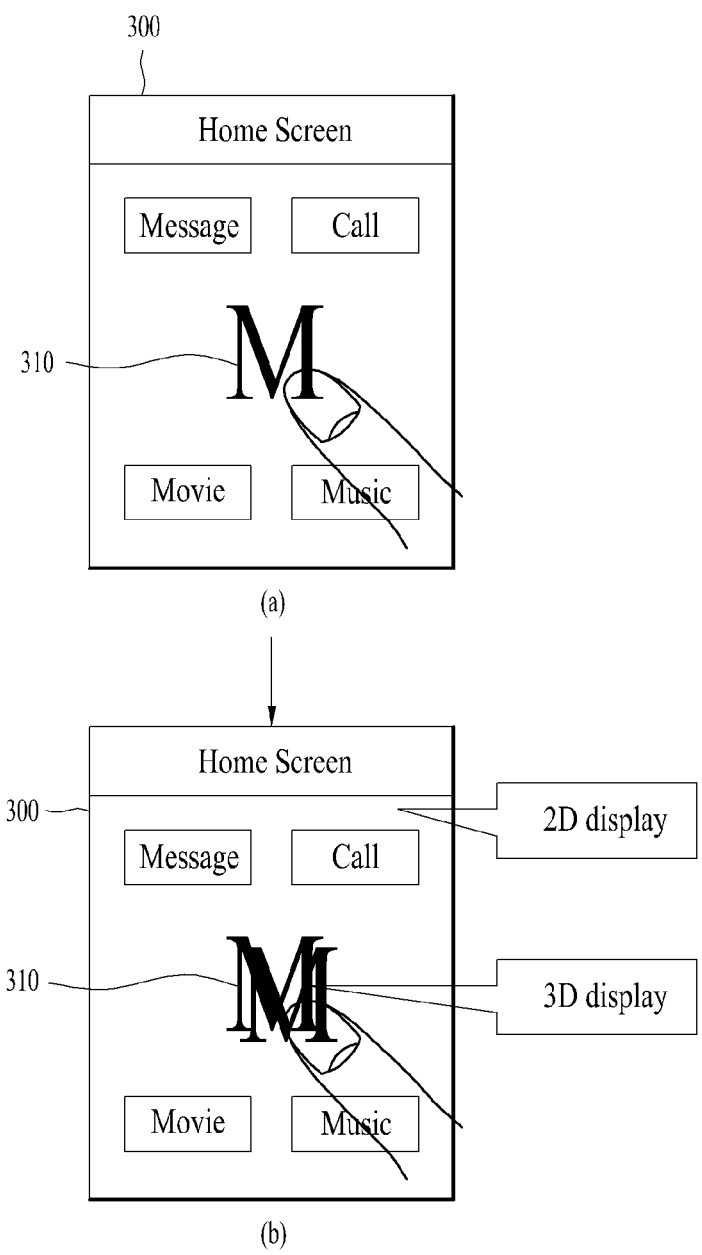
FIG. 13 is a diagram for screen configurations of a process for controlling a display style of a touch gesture trajectory line and a display style of a screen according to a $5^{th}$ embodiment of the present invention.

FIG. 13 is a diagram for screen configurations of a process for controlling a display style of a touch gesture trajectory line and a display style of a screen according to a 5th embodiment of the present invention.

Referring to FIG. 13, if a user's touch gesture is inputted to a screen 300 of a touchscreen [FIG. 13 (*a*)], the controller 180 displays a trajectory line having the same shape 'M' of a pattern of the inputted touch gesture [FIG. 13 (*b*)].

In doing so, when the trajectory line 310 is displayed on the screen 300, the controller 180 may control the trajectory line 310 to be discriminated well on the screen 300 by the user in a manner of controlling the trajectory line 310 and the screen 300 in 3D and 2D, respectively.

Alternatively, when the trajectory line 310 is displayed on the screen 300, the controller 180 may control the trajectory line 310 to be discriminated well on the screen by the user in a manner of controlling the trajectory line 310 and the screen 300 in 2D and 3D, respectively.

In case that a display style of the trajectory line 310 is set in advance to 3D or 2D via the trajectory line display style setting window 240 described with reference to FIG. 6 and that a display style of the screen 300 is set in advance to 2D or 3D via the screen display style setting window 250 described with reference to FIG. 6, the controller 180 may control the trajectory line 310 and the screen 300 to be displayed in 3D and 2D, respectively.

Meanwhile, if the input of the touch gesture is completed, the controller 180 controls the trajectory line 310 not to be displayed on the screen 300. If the screen 300 is displayed in 3D, the controller 180 controls the screen 300 to be displayed in the original 2D, searches the memory 160 for a function mapped to the touch gesture, and then executes the found function.

6th Embodiment

6th embodiment of the present invention relates to a process for discriminating a trajectory line of a touch gesture well on a screen in a manner of differentiating the trajectory line of the touch gesture and the screen from each other in color.

A 6th embodiment of the present invention is described in detail with reference to FIG. 14 as follows.

Figure 14:
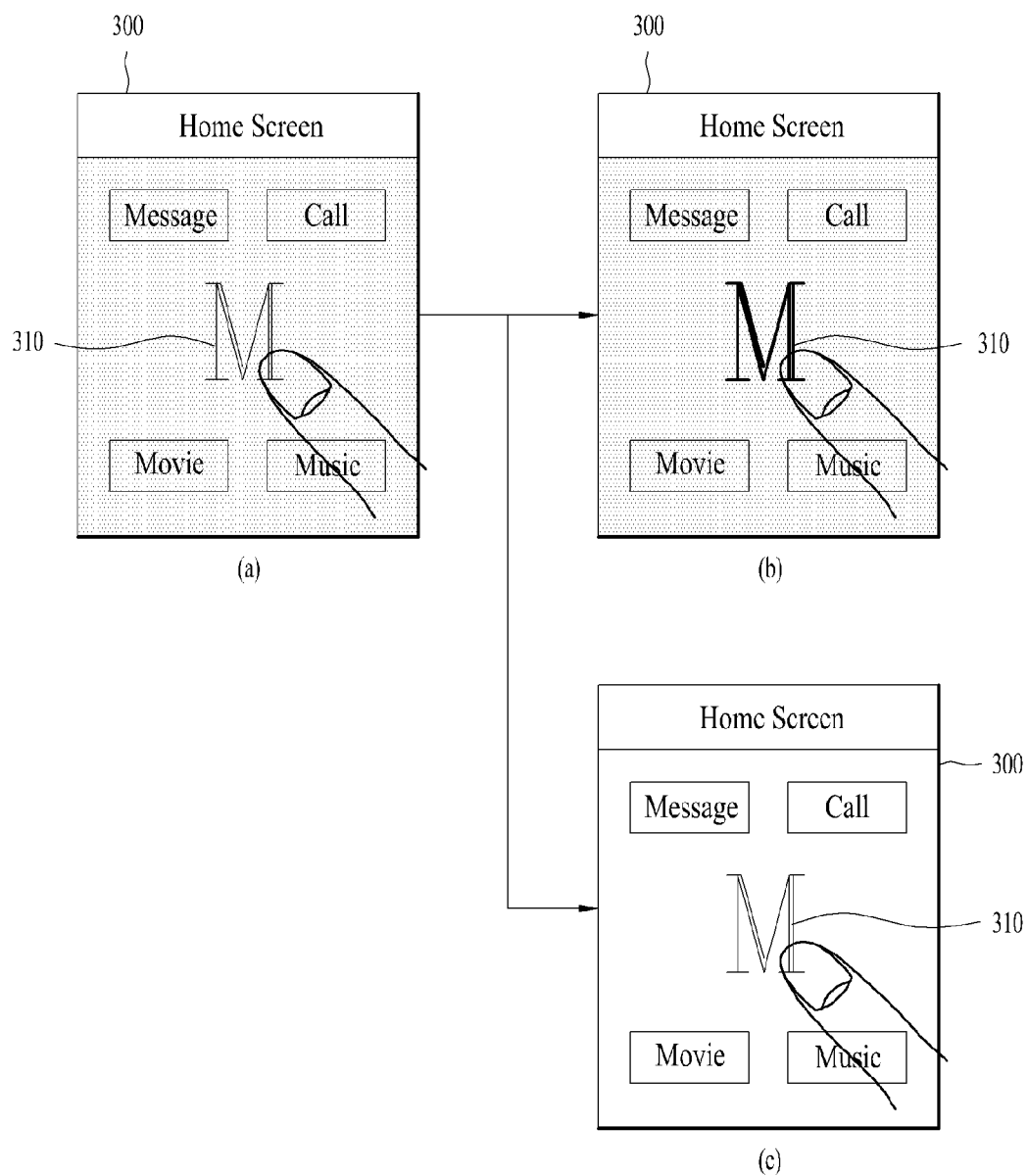
FIG. 14 is a diagram for screen configurations of a process for controlling a display style of a touch gesture trajectory line and a display style of a screen according to a $6^{th}$ embodiment of the present invention.

FIG. 14 is a diagram for screen configurations of a process for controlling a display style of a touch gesture trajectory line and a display style of a screen according to a 6th embodiment of the present invention.

Referring to FIG. 14, if a user's touch gesture is inputted to a screen 300 of a touchscreen [FIG. 14 (*a*)], the controller 180 displays a trajectory line having the same shape 'M' of a pattern of the inputted touch gesture [FIG. 10 (*b*)].

In doing so, referring to FIG. 14 (*b*) and FIG. 14 (*c*), when the trajectory line 310 is displayed, the controller 180 may control the trajectory line 310 to be discriminated well on the screen 300 by the user in a manner of controlling the trajectory line 310 to be displayed by having a color different from a current color of the screen 300.

Preferably, referring to FIG. 14 (*b*), the controller 180 recognizes a color at a position, at which the trajectory line 310 is displayed, within the screen 300 and then displays the trajectory line 310 in a color opposite to the recognized color. Furthermore, the controller 180 re-recognizes an average color of the recognized color and may then display the trajectory line 310 in a color opposite to the recognized average color.

Preferably, referring to FIG. 14 (*c*), the controller 180 recognizes a color of the screen 300 and a color of the trajectory line 310. If the color of the trajectory line 310 is equal or similar to that of the screen 300, the controller 180 may control the screen 300 to be displayed in a color opposite to that of the trajectory line 310.

In case that a color of the trajectory line 310 is set in advance via the trajectory line display style setting window 240 described with reference to FIG. 6 and that a color of the screen 300 is set in advance via the screen display style setting window 250 described with reference to FIG. 6, the controller 180 may control the trajectory line 310 and the screen 300 to be displayed in the set colors, respectively.

Meanwhile, if the input of the touch gesture is completed, the controller 180 controls the trajectory line 310 not to be displayed on the screen 300, changes the color of the screen 300 into an original color, searches the memory 160 for a function mapped to the touch gesture, and then executes the found function.

7th Embodiment

When a touch gesture is inputted to a specific content screen, a list of touch gestures available in the content is provided to a user. If a specific one of the touch gestures in the list is inputted, 7th embodiment of the present invention relates to a process for identifiably displaying a trajectory line of the inputted touch gesture within the content screen.

A 7th embodiment of the present invention is described in detail with reference to FIG. 15 as follows.

Figure 15:
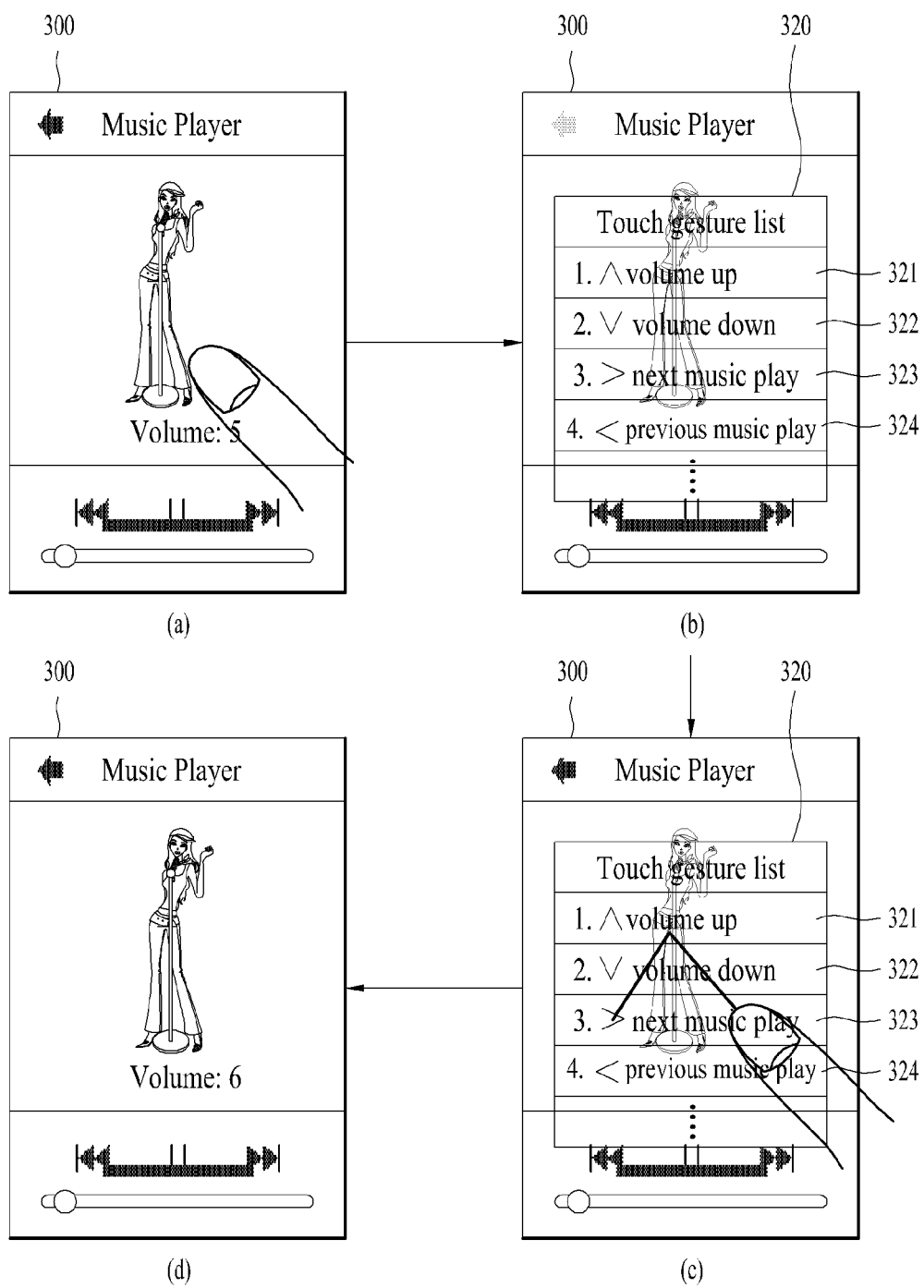
FIG. 15 is a diagram for screen configurations of a process for controlling a display style of a touch gesture trajectory line and a display style of a screen according to a $7^{th}$ embodiment of the present invention.

FIG. 15 is a diagram for screen configurations of a process for controlling a display style of a touch gesture trajectory line and a display style of a screen according to a 7th embodiment of the present invention.

Referring to FIG. 15, after the controller 180 has executed a specific content, while an executive screen 300 of the content is displayed, if a user touches the screen 300, the controller 180 searches the memory 160 for touch gestures available in the content environment [FIG. 15 (a)]. The controller 180 then displays a list 320 including the found touch gestures [FIG. 15 (b)].

In this case, the list 320 may include items 321 to 324 containing the touch gestures and functions assigned to the touch gestures, respectively.

For instance, referring to FIG. 15, the content is a music player application. The functions assigned to the touch gestures include a volume-up function, a volume-down function, a next music play function and a previous music play function, respectively.

The content mentioned in the description of the 7th embodiment of the present invention may be non-limited by the music player application. Preferably, as mentioned in the foregoing description, the content may include one of all functions, menus, data and the like, which can be executed in the mobile terminal 100. And, the functions may include all functions available in the content environment.

The user may be able to directly input a desired touch gesture to use to the content screen 300 or select an item corresponding to the desired gesture to use, by referring to the items 321 to 324 in the list 320. Hence, the user may be able to reflect a function assigned to the desired touch gesture to use on a current content.

In particular, referring to FIG. 15 (c), if a user inputs a touch gesture to use with reference to the list 320, the controller 180 identifiably displays a trajectory line (^) of the touch gesture in the content screen 300, as shown in one of the aforementioned 1st to 6th embodiments. If the input of the touch gesture is completed, referring to FIG. 15 (d), the controller 180 reflects the function assigned to the touch gesture on the content.

For instance, assuming that the function assigned to the touch gesture inputted by the user is the volume-up function, if the input of the touch gesture is completed, the controller 180 raises the volume of the content.

8th Embodiment

According to an 8th embodiment of the present invention, if a user's touch gesture is inputted to a screen, a trajectory line of the touch gesture is identifiably displayed on the screen. Simultaneously, touch gestures saved in the memory 160 are searched for a different touch gesture including a pattern of the touch gesture, which is being inputted to the screen. And, information indicating a function assigned to the found different touch gesture is then displayed.

In the following description, an 8th embodiment of the present invention is explained in detail with reference to FIG. 16.

Figure 16:
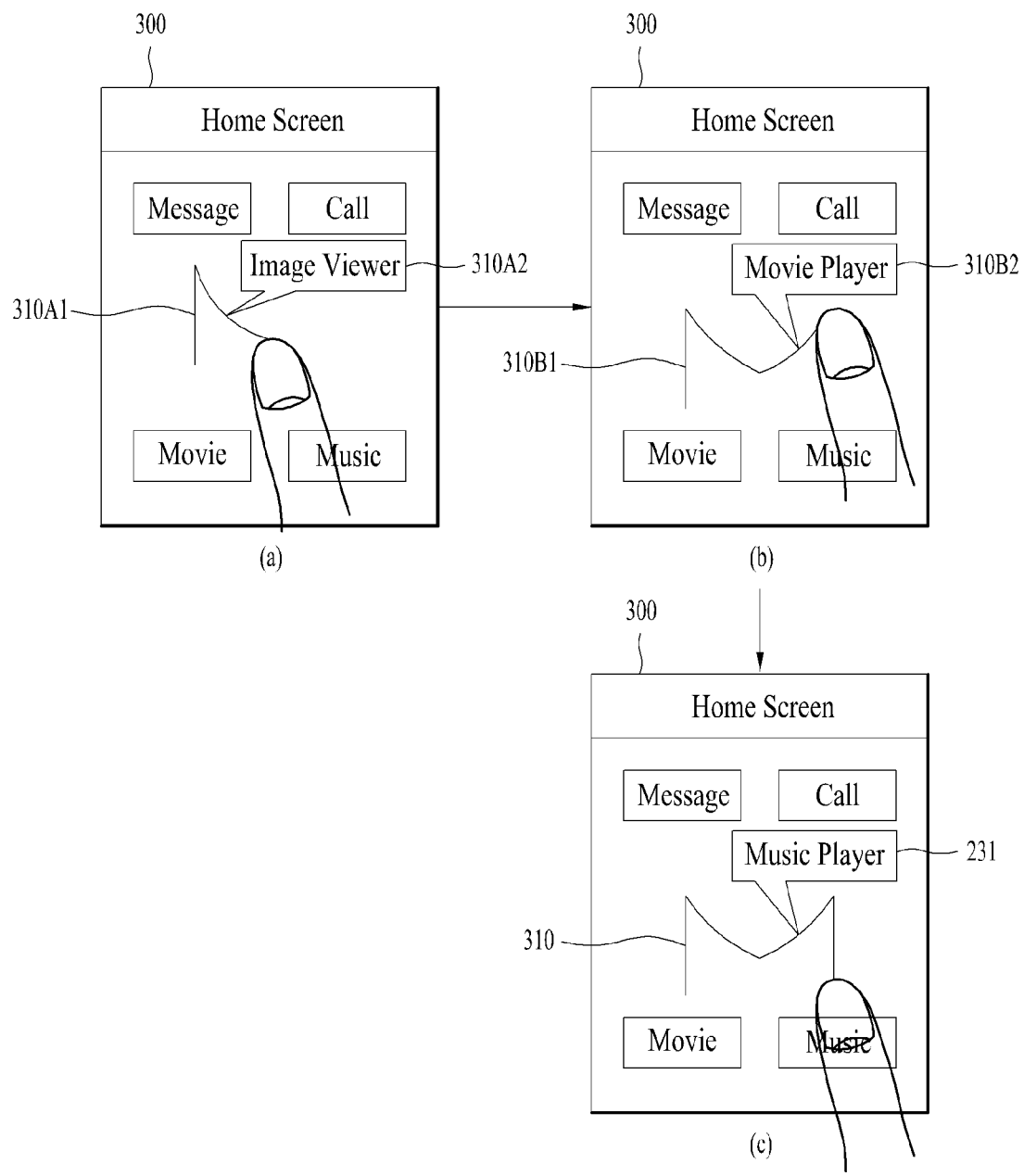
FIG. 16 is a diagram for screen configurations of a process for controlling a display style of a touch gesture trajectory line and a display style of a screen according to an $8^{th}$ embodiment of the present invention.

FIG. 16 is a diagram for screen configurations of a process for controlling a display style of a touch gesture trajectory line and a display style of a screen according to an 8th embodiment of the present invention.

Referring to FIG. 16, in order to input a touch gesture 310 having a specific pattern 'M' to a screen 300, a user performs inputs of 1st to 3rd touch gestures.

In particular, referring to FIG. 16 (a), If a user initially performs an input of a 1st touch gesture in order to input a desired touch gesture pattern M to the screen 300, the controller 180 identifiably displays a trajectory line 310A1 of the 1st touch gesture, of which input is in progress so far, on the screen 300 like one of the aforementioned 1st to 6th embodiments.

Subsequently, the controller 180 searches the memory 160 for at least one touch gesture including a pattern of the 1st touch gesture of which input is in progress so far. The controller 180 then displays a 1st information 310A2, which indicates a function assigned to the found touch gesture, on the screen 300.

For instance, in FIG. 16 (a), the function assigned to the found touch gesture is an image viewer function and the controller 180 displays the 1st information 310A2 indicating the image viewer function on the screen 300.

In doing so, while the 1st touch gesture is inputted so far, if the 1st touch gesture is released, the controller 180 executes the image viewer function assigned to the 1st touch gesture.

Subsequently, referring to FIG. 16 (b), if the user performs an input the 2nd touch gesture in continuation with the 1st touch gesture in order to input the desired touch gesture pattern M to the screen 300, the controller 180 identifiably displays a trajectory line 310B1 of the 2nd touch gesture, of which input is in progress so far, on the screen 300 like one of the aforementioned 1st to 6th embodiments.

Subsequently, the controller 180 searches the memory 160 for at least one touch gesture including a pattern of the 2nd touch gesture of which input is in progress so far. The controller 180 then displays a 2nd information 310B2, which indicates a function assigned to the found touch gesture, on the screen 300.

For instance, in FIG. 16 (b), the function assigned to the found touch gesture is a video (or movie) player function and the controller 180 displays the 2nd information 310B2 indicating the video player function on the screen 300.

In doing so, while the 2nd touch gesture is inputted so far, if the 2nd touch gesture is released, the controller 180 executes the video player function assigned to the 2nd touch gesture.

Finally, referring to FIG. 16 (c), if the user performs an input the 3rd touch gesture in continuation with the 2nd touch gesture in order to input the desired touch gesture pattern M to the screen 300, the controller 180 identifiably displays a trajectory line 310 of the 3rd touch gesture, of which input is in progress so far, on the screen 300 like one of the aforementioned 1st to 6th embodiments.

Subsequently, the controller 180 searches the memory 160 for a function (e.g., music player) assigned to the pattern M of the 3rd touch gesture and then displays a 3rd information 231, which indicates the found function, on the screen 300.

For instance, in FIG. 16 (c), since the $3^{rd}$ touch gesture is the touch gesture desired by the user, the controller 180 displays the $3^{rd}$ information indicating the function assigned to the touch gesture pattern M desired by the user.

If the inputs of the $1^{st}$ to $3^{rd}$ touch gestures are completed, the controller 180 executes the music player function assigned to the $3^{rd}$ touch gesture.

$9^{th}$ Embodiment

According to a $9^{th}$ embodiment of the present invention, as mentioned in the foregoing description with reference to FIG. 5, if a $1^{st}$ touch gesture having a specific main function assigned thereto and a $2^{nd}$ touch gesture having a sub-function subordinate to the main function assigned thereto are respectively inputted to a screen, trajectory lines of the inputted $1^{st}$ and $2^{nd}$ touch gestures are identifiably displayed on the screen and the main function assigned to the $1^{st}$ touch gesture and the sub-function assigned to the $2^{nd}$ touch gesture are executed simultaneously.

In the following description, a $9^{th}$ embodiment of the present invention is explained in detail with reference to FIG. 17.

Figure 17:
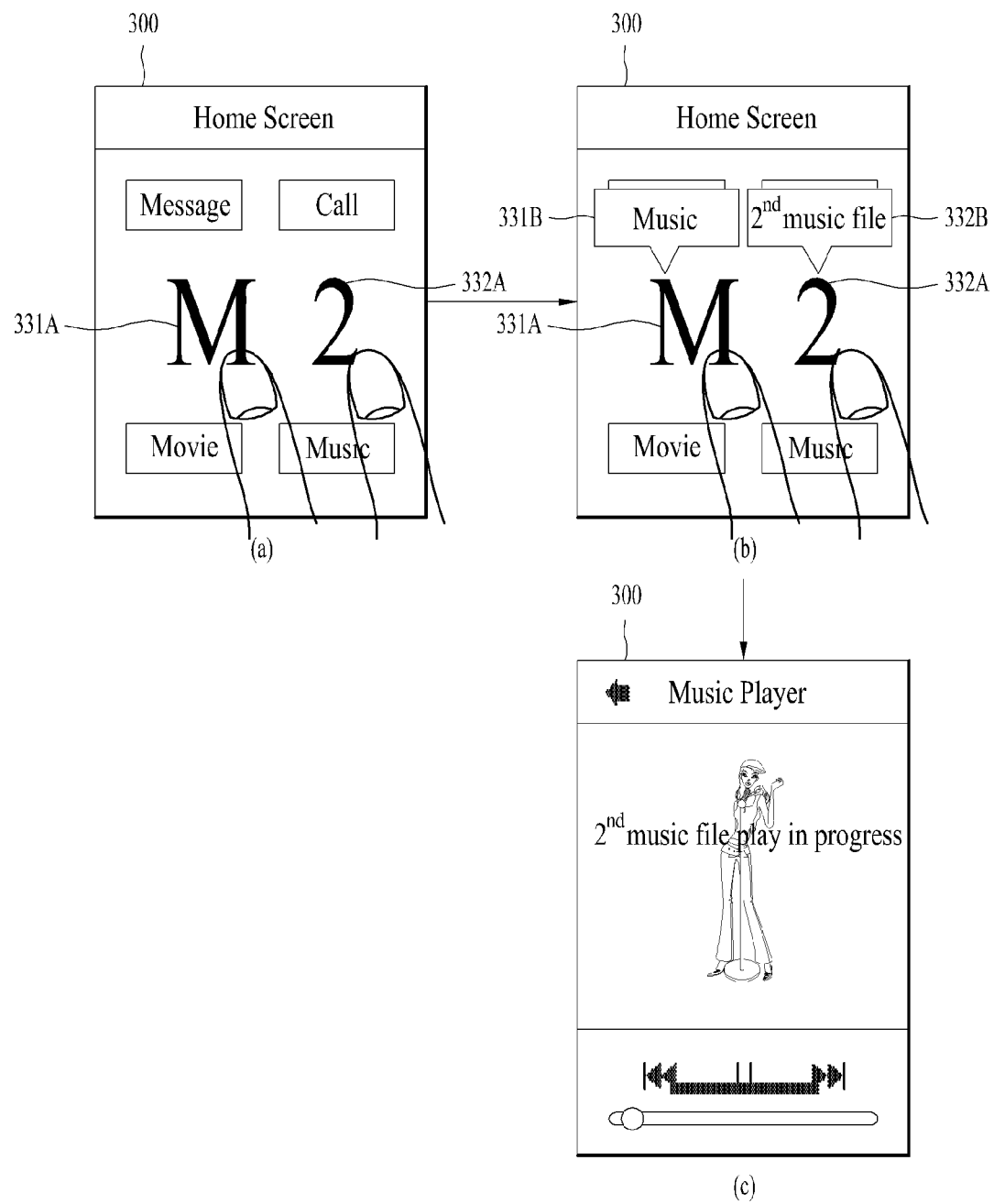
FIG. 17 is a diagram for screen configurations of a process for controlling a display style of a touch gesture trajectory line and a display style of a screen according to a $9^{th}$ embodiment of the present invention.

FIG. 17 is a diagram for screen configurations of a process for controlling a display style of a touch gesture trajectory line and a display style of a screen according to a $9^{th}$ embodiment of the present invention.

Referring to FIG. 17 (a), if a $1^{st}$ touch gesture having a specific main function assigned thereto by the process described with reference to FIG. 5 and a $2^{nd}$ touch gesture having a sub-function subordinate to the main function assigned thereto by the process described with reference to FIG. 5 are respectively inputted to a screen 300, the controller 180 identifiably displays trajectory lines 331A and 332A of the inputted $1^{st}$ and $2^{nd}$ touch gestures on the screen 300.

In doing so, while display styles of the trajectory lines 331A and 332A of the $1^{st}$ and $2^{nd}$ touch gestures are set equal to each other, the controller 180 may display the trajectory lines 331A and 332A in the display style opposite to a display style of the screen 300.

While the trajectory lines 331A and 332A of the $1^{st}$ and $2^{nd}$ touch gestures are identifiably displayed on the screen 300, the controller may be able to display the trajectory lines 331A and 332A of the $1^{st}$ and $2^{nd}$ touch gestures in a manner of discriminating the trajectory lines 331A and 332A from each other using at least one of the aforementioned $1^{st}$ to $6^{th}$ embodiments. In particular, a display style of the trajectory line 331A of the $1^{st}$ touch gesture having the main function assigned thereto is changed into the display style of the trajectory line 310 of the touch gesture explained in the description of at least one of the $1^{st}$ to $6^{th}$ embodiments and a display style of the trajectory line 332A of the $2^{nd}$ touch gesture having the sub-function assigned thereto is changed into the display style of the screen 300 explained in the description of at least one of the $1^{st}$ to $6^{th}$ embodiments.

In doing so, both of the $1^{st}$ and $2^{nd}$ touch gestures may include contact touch gestures or proximity touch gestures. Alternatively, one of the $1^{st}$ touch gesture and the $2^{nd}$ touch gesture may include a contact touch gesture while the other is a proximity touch gesture. Preferably, the main function assigned $1^{st}$ touch gesture may include a contact touch gesture, while the sub-function assigned $2^{nd}$ touch gesture may include a proximity touch gesture.

Subsequently, referring to FIG. 17 (b), if the trajectory lines 331A and 332A of the $1^{st}$ and $2^{nd}$ touch gestures are displayed, the controller 180 may be able to display $1^{st}$ and $2^{nd}$ informations 331B and 332B indicating the main function and the sub-function assigned to the $1^{st}$ and $2^{nd}$ touch gestures, respectively.

For instance, FIG. 17 shows that the main function is a music player function, that the sub-function subordinate to the music player function is a $2^{nd}$ music file play, and that the controller 180 displays the $1^{st}$ information 331B indicating the music player function and the $2^{nd}$ information 332B indicating the $2^{nd}$ music file play function.

Thus, if the inputs of the $1^{st}$ and $2^{nd}$ touch gestures are completed, referring to FIG. 17 (c), the controller 180 simultaneously executes the main function assigned to the $1^{st}$ touch gesture and the sub-function assigned to the $2^{nd}$ touch gesture.

For instance, FIG. 17 (c) shows that the music player function is execute as the main function and that the $2^{nd}$ music file play function is execute as the sub-function.

$10^{th}$ Embodiment

According to a $10^{th}$ embodiment of the present invention, while at least two contents including $1^{st}$ and $2^{nd}$ contents are simultaneously execute (e.g., multitasked) and an executive screen of the $1^{st}$ content is displayed, if a touch gesture, to which a function for an operation control of the $2^{nd}$ content is assigned, is inputted to the executive screen of the $1^{st}$ content, a trajectory line of the inputted touch gesture is identifiably displayed on the executive screen of the $1^{st}$ content and the $2^{nd}$ content operation control function assigned to the touch gesture is executed on the executive screen of the $1^{st}$ content without switching the executive screen of the $1^{st}$ content to an executive screen of the $2^{nd}$ content, simultaneously.

In the following description, a $10^{th}$ embodiment of the present invention is explained in detail with reference to FIG. 18.

Figure 18:
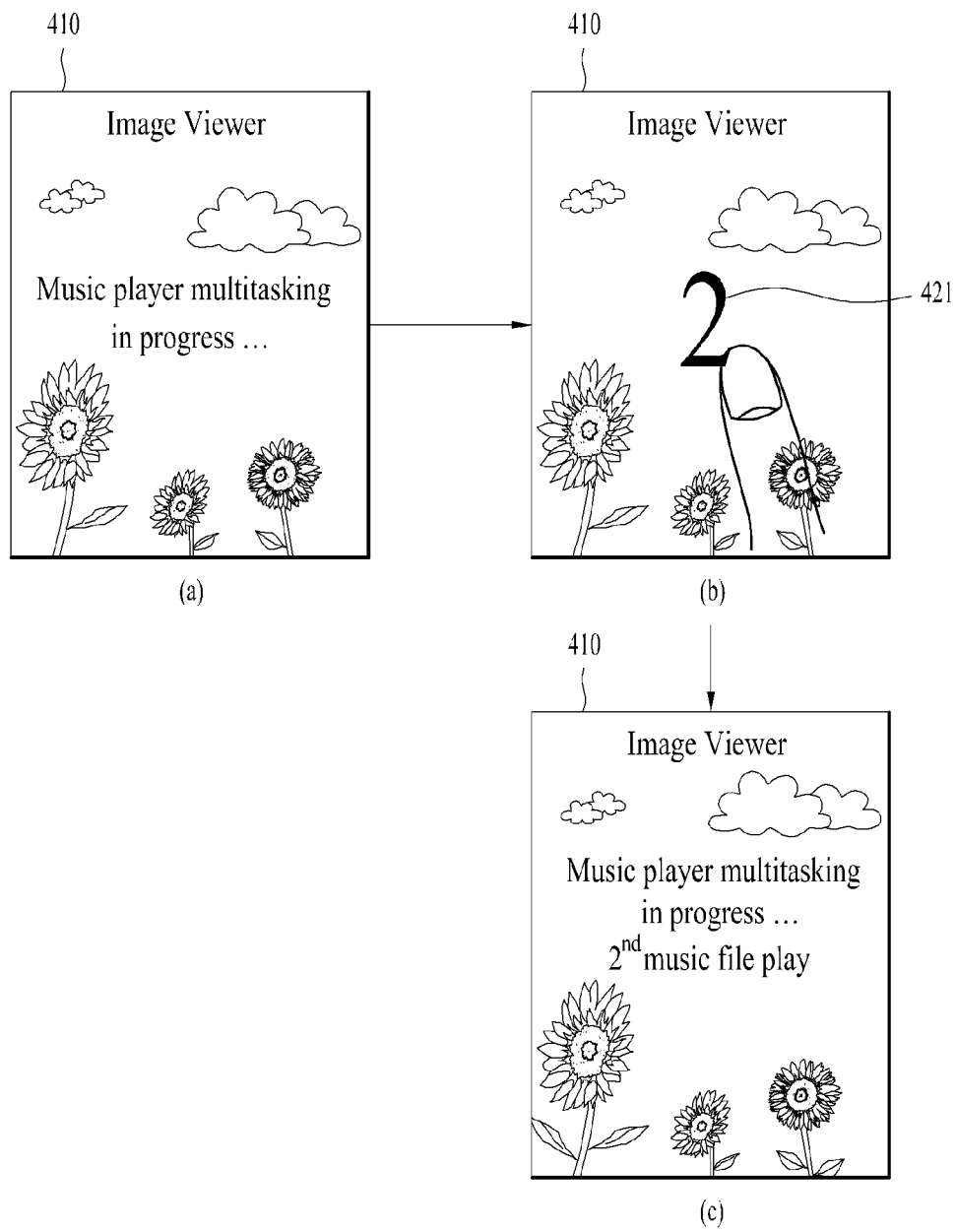
FIG. 18 is a diagram for screen configurations of a process for controlling a display style of a touch gesture trajectory line and a display style of a screen according to a $10^{th}$ embodiment of the present invention.

FIG. 18 is a diagram for screen configurations of a process for controlling a display style of a touch gesture trajectory line and a display style of a screen according to a $10^{th}$ embodiment of the present invention.

Referring to FIG. 18 (a), while $1^{st}$ and $2^{nd}$ contents are simultaneously execute (i.e., multitasked), an executive screen of the $1^{st}$ content is being displayed.

For instance, in FIG. 18, the $1^{st}$ content displayed on a current executive screen 410 is an image viewer function and the $2^{nd}$ content, which is currently execute but is not displayed on the screen, is a music player function.

Referring to FIG. 18 (b), based on the process described with reference to at least one of FIGS. 3 to 7, if a $1^{st}$ touch gesture, to which an operation control function of the $2^{nd}$ content is assigned, is inputted, the controller 180 controls a trajectory line 421 of the $1^{st}$ touch gesture to be identifiably displayed on the screen 300 in accordance with at least one of the aforementioned $1^{st}$ to $6^{th}$ embodiments.

Referring to FIG. 18 (c), if the input of the $1^{st}$ touch gesture is completed, the controller 180 reflects the $2^{nd}$ content operation control function assigned to the $1^{st}$ touch gesture on the $2^{nd}$ content.

For instance, referring to FIG. 18 (c), the $2^{nd}$ content operation control function assigned to the $1^{st}$ touch gesture is a $2^{nd}$ music file play function. The controller 180 executes the $2^{nd}$ music file play function assigned to the $1^{st}$ touch gesture while displaying the executive screen 410 of the $1^{st}$ content, without switching the executive screen 410 of the $1^{st}$ content to an executive screen of the $2^{nd}$ content.

$11^{th}$ Embodiment

According to an $11^{th}$ embodiment of the present invention, while at least two contents including $1^{st}$ and $2^{nd}$ contents are simultaneously execute (e.g., multitasked) and an executive screen of the 1st content is displayed, if a 1st touch gesture, to which a function for an operation control function of the 1st content is assigned, and a 2nd touch gesture, to which a function for an operation control function of the 2nd content is assigned, are respectively inputted to the executive screen of the 1st content, trajectory lines of the inputted 1st and 2nd touch gestures are identifiably displayed on the executive screen of the 1st content and both of the operation control functions assigned to the 1st and 2nd touch gestures are simultaneously executed, simultaneously.

In the following description, an 11th embodiment of the present invention is explained in detail with reference to FIG. 19.

Figure 19:
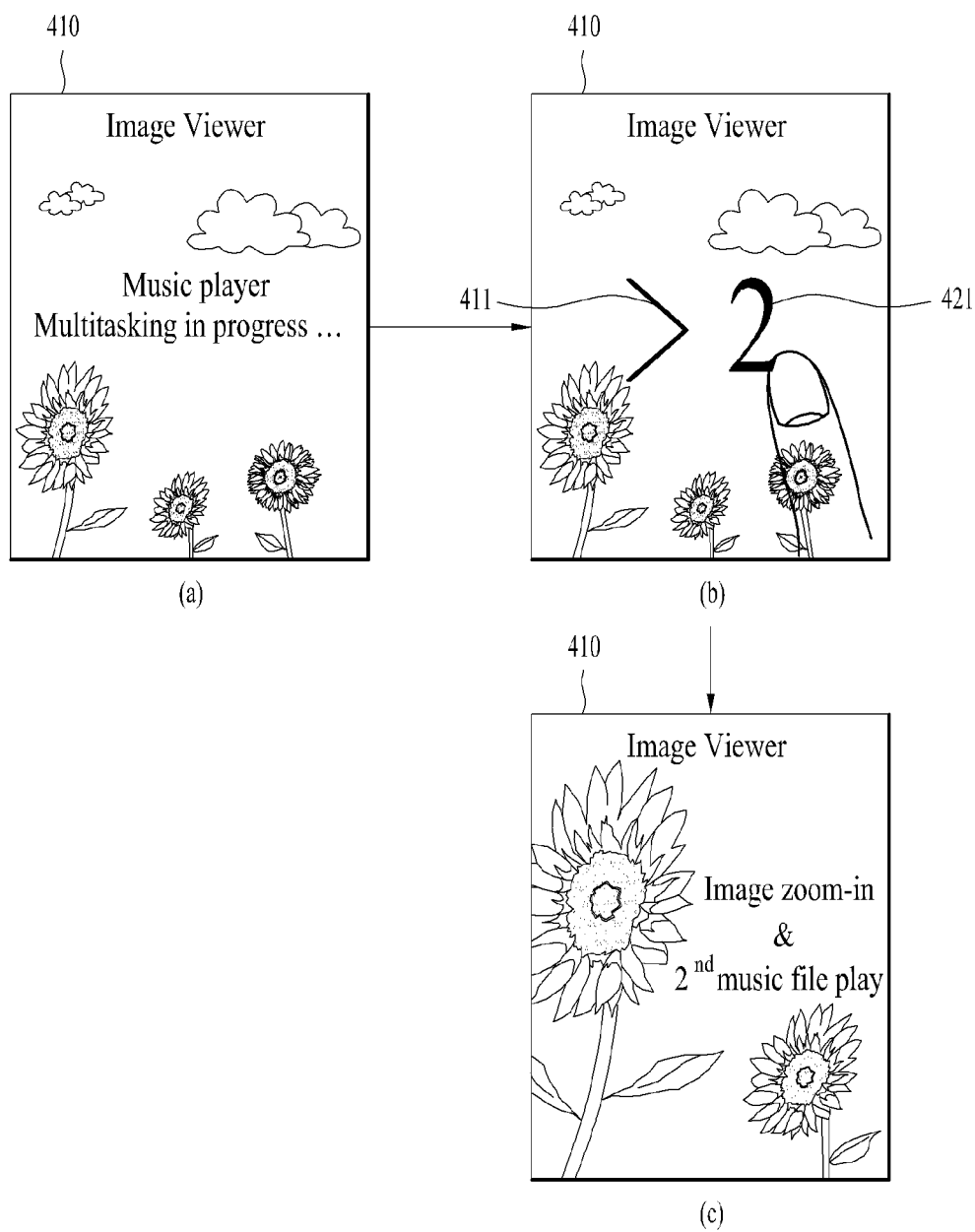
FIG. 19 is a diagram for screen configurations of a process for controlling a display style of a touch gesture trajectory line and a display style of a screen according to a $11^{th}$ embodiment of the present invention.

FIG. 19 is a diagram for screen configurations of a process for controlling a display style of a touch gesture trajectory line and a display style of a screen according to a 11th embodiment of the present invention.

Referring to FIG. 19 (a), while 1st and 2nd contents are simultaneously execute (i.e., multitasked), an executive screen of the 1st content is being displayed.

For instance, in FIG. 19, the 1st content displayed on a current executive screen 410 is an image viewer function and the 2nd content, which is currently execute but is not displayed on the screen, is a music player function.

Referring to FIG. 19 (b), based on the process described with reference to at least one of FIGS. 3 to 7, if a 1st touch gesture, to which an operation control function of the 2nd content is assigned, is inputted, and a 2nd touch gesture, to which an operation control function of the 2nd content is assigned, are respectively inputted, the controller 180 controls trajectory lines 411 and 421 of the 1st and 2nd touch gestures to be identifiably displayed on the executive screen 410 of the 1st content in accordance with at least one of the aforementioned 1st to 6th embodiments.

In doing so, while display styles of the trajectory lines 411 and 421 are set equal to each other, the controller 180 may display the trajectory lines 411 and 421 in the display style opposite to a display style of the executive screen 410 of the 1st content.

Moreover, while the trajectory lines 411 and 421 of the 1st and 2nd touch gestures are identifiably displayed on the executive screen 410 of the 1st content, the controller may be able to display the trajectory lines 411 and 421 of the 1st and 2nd touch gestures in a manner of discriminating the trajectory lines 411 and 421 from each other using at least one of the aforementioned 1st to 6th embodiments.

Besides, if the trajectory lines 411 and 421 of the 1st and 2nd touch gestures are displayed, as mentioned in the foregoing description with reference to FIG. 17, the controller 180 may be able to display a 1st information indicating the operation control function assigned to the 1st touch gesture and a 2nd information indicating the operation control function assigned to the 2nd touch gesture [not shown in FIG. 19].

Referring to FIG. 19 (c), if the inputs of the 1st and 2nd touch gestures are completed, the controller 180 simultaneously executes the functions respectively assigned to the 1st and 2nd touch gestures.

For instance, referring to FIG. 19, the 1st content is an image viewer function, the function assigned to the 1st touch gesture is an image enlarging function, the 2nd content is a music player function, and the function assigned to the 2nd touch gesture is a 2nd music file play function.

In this case, while maintaining the currently displayed executive screen 410 of the 1st content, the controller 180 simultaneously executes the image enlarging function assigned to the 1st touch gesture and the 2nd music file play function assigned to the 2nd touch gesture.

12th Embodiment

According to a 12th embodiment of the present invention, if a touch gesture having a specific function assigned thereto is inputted to a screen, a trajectory line of the touch gesture is identifiably displayed and a size of a contact area of the touch gesture is recognized, simultaneously. In accordance with the recognized size of the contact area, an executive state of the function assigned to the touch gesture is differentiated.

In the following description, a 12th embodiment of the present invention is explained in detail with reference to FIG. 20.

Figure 20:
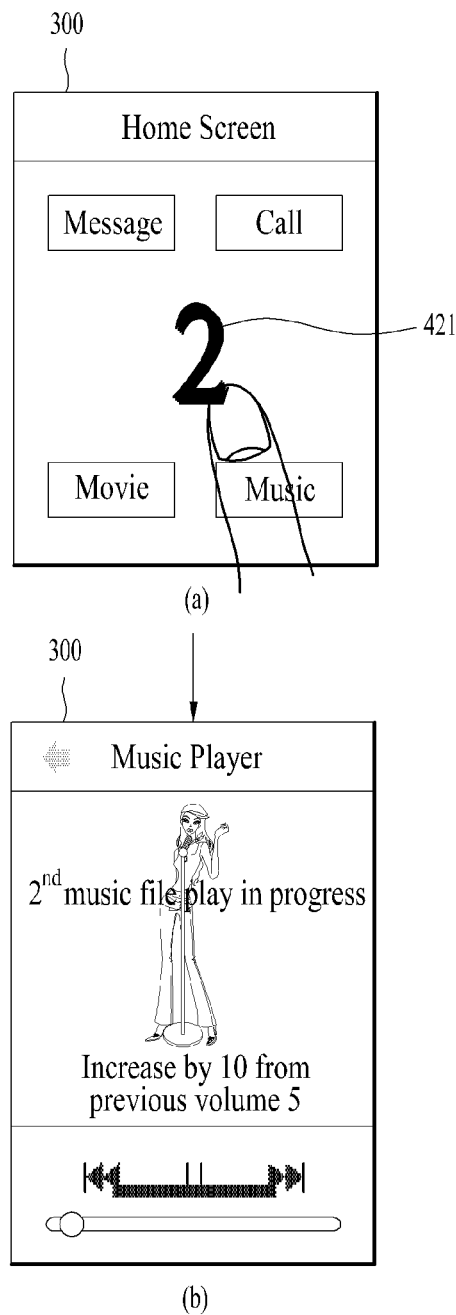
FIG. 20 is a diagram for screen configurations of a process for controlling a display style of a touch gesture trajectory line and a display style of a screen according to a $12^{th}$ embodiment of the present invention.

FIG. 20 is a diagram for screen configurations of a process for controlling a display style of a touch gesture trajectory line and a display style of a screen according to a 12th embodiment of the present invention.

FIG. 20 (a) shows that a touch gesture having a specific function assigned thereto is inputted to a screen 300.

For instance, FIG. 20 shows that the function assigned to the touch gesture is a 2nd music file play function.

After a trajectory line 421 of the touch gesture has been identifiably displayed on the screen 300, if the input of the touch gesture is completed, the controller 180 recognizes a size of a contact area of the touch gesture with the screen 300 and then controls an executive state of the function assigned to the touch gesture in accordance with the recognized size of the contact area.

For instance, referring to FIG. 20 (b), the function assigned to the touch gesture is the 2nd music file play function. The greater the contact area size of the touch gesture becomes, the higher the controller 180 raises the volume of the 2nd music file in the course of playing back the 2nd music file.

For another instance, assuming that the function assigned to the touch gesture is an image enlarging function, the controller 180 may be able to enlarge an image if the contact area size of the touch gesture increases. And, the controller 180 may be able to reduce an image if the contact area size of the touch gesture decreases.

13th Embodiment

13th embodiment of the present invention relates to a process for providing a function different in accordance with a display style of trajectory line set by a user despite the same touch gesture as shown in FIG. 7.

In the following description, a 13th embodiment of the present invention is explained in detail with reference to FIG. 21.

Figure 21:
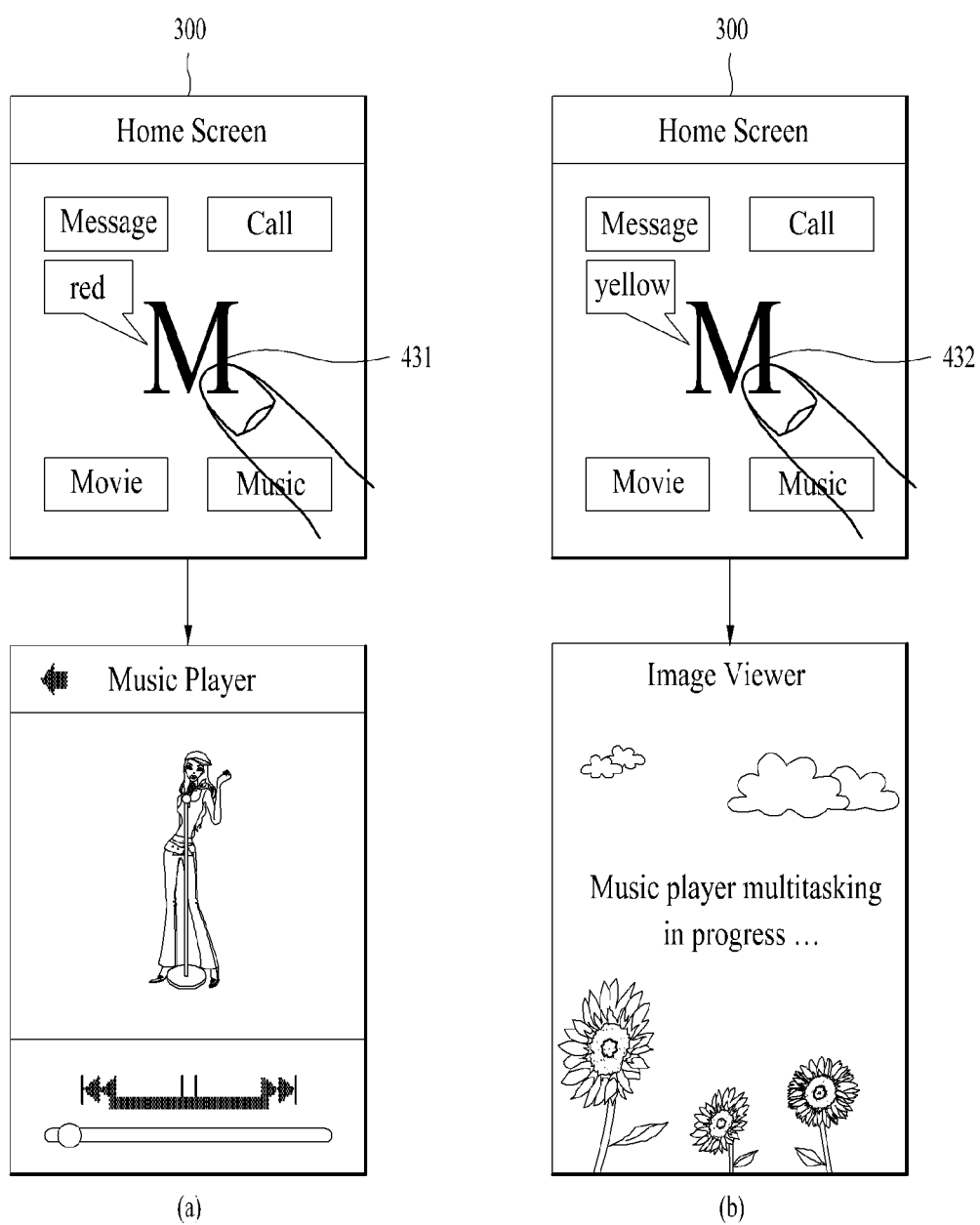
FIG. 21 is a diagram for screen configurations of a process for controlling a display style of a touch gesture trajectory line and a display style of a screen according to a $13^{th}$ embodiment of the present invention.

FIG. 21 is a diagram for screen configurations of a process for controlling a display style of a touch gesture trajectory line and a display style of a screen according to a 13th embodiment of the present invention.

Based on the process aforementioned with reference to FIG. 7, FIG. 21 (a) and FIG. 21 (b) show that different display styles are set for trajectory lines of 1st and 2nd touch gestures of the same pattern, respectively and that different functions are set for the 1st and 2nd touch gestures of the sam3 pattern, respectively.

For instance, referring to FIG. 21 (a), based on the process aforementioned with reference to FIG. 7, a display style of a trajectory line 431 of the 1st touch gesture is set to red and a music player function is assigned to the 1st touch gesture.

Moreover, referring to FIG. 21 (b), as mentioned in the foregoing description with reference to FIG. 7, a display style of a trajectory line 431 of the 1st touch gesture is set to yellow and an image viewer function is assigned to the 2nd touch gesture.

For instance, referring to FIG. 21 (a), if the 1st touch gesture having a color of the trajectory line 431 set to red is inputted to a screen 300, the controller 180 identifiably displays the trajectory line 431 of the 1st touch gesture on the screen 300 and then executes the music player function assigned to the 1st touch gesture.

Moreover, referring to FIG. 21 (b), if the 2nd touch gesture having a color of the trajectory line 432 set to yellow is inputted to a screen 300, the controller 180 identifiably displays the trajectory line 432 of the 2nd touch gesture on the screen 300 and then executes the image viewer function assigned to the 2nd touch gesture.

Accordingly, the present invention provides the following effects and/or advantages.

First of all, the present invention controls a display operation of a trajectory line and/or a display operation of a screen in order for the trajectory line of a touch gesture to be well identified on a screen of a touchscreen, thereby enabling a user to well identify a trajectory line of a touch gesture inputted by the user on a current screen of the touchscreen.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a memory configured to store at least one touch gesture to which a specific function is assigned;
a touchscreen having a screen configured to receive the at least one touch gesture; and
a controller configured to:
control the touchscreen to display a trajectory line of the received at least one touch gesture on a background within the screen such that the trajectory line can be discriminated from other information displayed on the screen, the trajectory line displayed either by displaying the trajectory line more prominently than the background by changing a color of the background to a color other than white that is different than a color of the trajectory line or by displaying the background semi-transparently
search the memory for the specific function assigned to the at least one touch gesture; and
execute the assigned specific function.

2. The mobile terminal of claim 1, wherein the controller is further configured to control the touchscreen to display the trajectory line or the screen brighter than the other such that the trajectory line can be discriminated from the other information displayed on the screen.

3. The mobile terminal of claim 1, wherein the controller is further configured to:
recognize a color of a specific portion of the screen at which the trajectory line will be displayed; and
control the touchscreen to display the trajectory line in a different color than the recognized color.

4. The mobile terminal of claim 3, wherein the controller is further configured to:
determine that at least two colors exist at the specific portion of the screen;
determine an average color of the at least two colors; and
display the trajectory line in a different color than the average color.

5. The mobile terminal of claim 1, wherein the controller is further configured to control the touchscreen to display the trajectory line or the screen 3-dimensionally (3D) and the other 2-dimensionally (2D) such that the trajectory line can be discriminated from the other information displayed on the screen.

6. The mobile terminal of claim 1, wherein the controller is further configured to control the touchscreen to display the trajectory line or a line displayed on the screen bolder than the other such that the trajectory line can be discriminated from the other information displayed on the screen.

7. The mobile terminal of claim 1, wherein:
at least two touch gestures are stored in the memory; and
the controller is further configured to:
detect receipt of the at least two touch gestures via the screen;
search the memory for the at least two touch gestures; and
control the touchscreen to display a list including patterns and corresponding functions of the at least two touch gestures.

8. The mobile terminal of claim 1, wherein:
an executable function of a specific application is assigned to each of the at least one touch gesture; and
the controller is further configured to:
search the memory while the at least one touch gesture is being received to identify at least one stored touch gesture that includes a pattern of the at least one touch gesture being received; and
control the touchscreen to display information indicating a function assigned to the identified at least one stored touch gesture.

9. The mobile terminal of claim 1, wherein:
at least a first touch gesture and a second touch gesture are stored in the memory, a specific main function assigned to the first touch gesture and a sub-function that is subordinate to the specific main function assigned to the second touch gesture; and
the controller is further configured to:
control the touchscreen to display a first trajectory line of the first touch gesture and a second trajectory line of the second touch gesture on the screen when both the first touch gesture and the second touch gesture are received; and
simultaneously execute both the main function and the sub-function.

10. The mobile terminal of claim 9, wherein the first touch gesture or the second touch gesture comprises a contact touch and the other touch gesture comprises a proximity touch.

11. The mobile terminal of claim 9, wherein the first and second touch gestures comprise independent touch gestures.

12. The mobile terminal of claim 9, wherein the controller is further configured to:
control the touchscreen to display information on the first trajectory line that indicates the specific main function; and
control the touchscreen to display information on the second trajectory line that indicates the sub-function.

13. The mobile terminal of claim 9, wherein the controller is further configured to control the touchscreen to display the first trajectory line and the second trajectory line such that the first trajectory line can be discriminated from the second trajectory line.

14. The mobile terminal of claim 1, wherein the controller is further configured to:

simultaneously execute a first function related to first content and a second function related to second content, the first content having a corresponding first screen and the second content having a corresponding second screen;

control the touchscreen to display the first screen;

detect receipt on the displayed first screen of a specific touch gesture to which an operation control function of the second content is assigned;

control the touchscreen to identifiably display on the displayed first screen a trajectory line of the detected specific touch gesture; and execute the operation control function.

15. The mobile terminal of claim 1, wherein the controller is further configured to:

simultaneously execute a first function related to first content and a second function related to second content, the first content having a corresponding first screen and the second content having a corresponding second screen;

control the touchscreen to display the second screen corresponding to the second content;

detect receipt on the displayed second screen of a first specific touch gesture to which an operation control function of the first content is assigned and a second specific touch gesture to which an operation control function of the second content is assigned;

control the touchscreen to identifiably display on the screen a trajectory line of the detected first specific touch gesture and a trajectory line of the detected second specific touch gesture; and simultaneously execute the operation control function of the first content and the operation control function of the second content.

16. The mobile terminal of claim 1, wherein the controller is further configured to:

recognize a size of a contact area on the screen of the received at least one touch gesture; and execute the assigned specific function according to the recognized size of the contact area.

17. A method of controlling a mobile terminal, the method comprising:

assigning a specific function to at least one touch gesture;

receiving the at least one touch gesture via a touchscreen;

displaying a trajectory line of the received at least one touch gesture on a background within the touchscreen such that the trajectory line can be discriminated from other information displayed on the touchscreen, the trajectory line displayed either by displaying the trajectory line more prominently than the background by changing a color of the background to a color other than white that is different than a color of the trajectory line or by displaying the background semi-transparently; and executing the specific function after input of the at least one touch gesture is completed.

* * * * *